(12) United States Patent
Walker, Jr. et al.

(10) Patent No.: US 11,691,381 B2
(45) Date of Patent: Jul. 4, 2023

(54) THERMOFORMABLE BEADED ARTICLES WITH REMOVABLE STABILIZING LAYER AND METHODS THEREOF

(71) Applicant: 3M INNOVATIVE PROPERTIES COMPANY, St. Paul, MN (US)

(72) Inventors: Christopher B. Walker, Jr., St. Paul, MN (US); Matthew R. C. Atkinson, Grant, MN (US); Mary M. Caruso Dailey, Maplewood, MN (US); John C. Clark, Maplewood, MN (US); Vivek Krishnan, St. Paul, MN (US); Alexander J. Kugel, Woodbury, MN (US); Steven J. McMan, Stillwater, MN (US); Abdullahi A. Mohamud, Minnetonka, MN (US)

(73) Assignee: 3M innovative Properties Company, St. Paul, MN (US)

( * ) Notice: Subject to any disclaimer, the term of this patent is extended or adjusted under 35 U.S.C. 154(b) by 144 days.

(21) Appl. No.: 16/336,999

(22) PCT Filed: Oct. 6, 2017

(86) PCT No.: PCT/US2017/055476
§ 371 (c)(1),
(2) Date: Mar. 27, 2019

(87) PCT Pub. No.: WO2018/075265
PCT Pub. Date: Apr. 26, 2018

(65) Prior Publication Data
US 2020/0031092 A1  Jan. 30, 2020

Related U.S. Application Data

(60) Provisional application No. 62/409,439, filed on Oct. 18, 2016.

(51) Int. Cl.
*B05D 3/06* (2006.01)
*B32B 5/16* (2006.01)
(Continued)

(52) U.S. Cl.
CPC .............. *B32B 5/16* (2013.01); *B32B 5/22* (2013.01); *B05D 3/067* (2013.01); *B32B 7/06* (2013.01);
(Continued)

(58) Field of Classification Search
CPC .... B32B 5/16; B32B 5/22; B32B 5/28; B32B 3/10; B32B 3/14; B32B 3/16; B32B 3/18;
(Continued)

(56) References Cited

U.S. PATENT DOCUMENTS 2,646,364 A   7/1953  Porth
3,382,908 A   5/1968  Palmquist
(Continued)

FOREIGN PATENT DOCUMENTS

CN   101052520   10/2007
EP   1 860 468   11/2007
(Continued)

OTHER PUBLICATIONS

Miller, "A New Derivation of Post Gel Properties of Network Polymers", Macromolecules, Mar.-Apr. 1976, vol. 9, No. 2, pp. 206-211.
(Continued)

*Primary Examiner* — Catherine A. Simone
(74) *Attorney, Agent, or Firm* — Julie Lapos-Kuchar

(57) ABSTRACT

Described herein is an article comprising (i) bead film comprising a binder resin layer and a plurality of microspheres partially embedded in the binder resin layer such that a portion of the microspheres outwardly protrude a first distance from the surface of the binder resin layer; (ii) a
(Continued)

stabilizing layer disposed on the outwardly protruding microspheres opposite the binder resin layer, wherein the stabilizing layer intimately conforms to the protruding microspheres, and wherein the stabilizing layer has a Tg less than 100 C and a storage modulus at 150° C. of at least 1.5 MPa; and (iii) a release agent, wherein (a) the binder resin layer comprises the release agent, (b) the stabilizing layer comprises the release agent, and/or (c) an intermediate layer comprises the release agent, wherein the intermediate layer is disposed between the monolayer of microspheres and the stabilizing layer, with the proviso that when the binder resin layer has a fluorine content along the polymeric backbone greater than 65 wt %, the stabilizing layer comprises a release agent selected from a silicone and a fluoropolymer. Also disclosed herein are methods of making thermoformable bead films.

16 Claims, 7 Drawing Sheets

(51) Int. Cl.
*B32B 5/22* (2006.01)
*B32B 7/06* (2019.01)
*D06P 1/52* (2006.01)

(52) U.S. Cl.
CPC ..... *B32B 2274/00* (2013.01); *B32B 2307/418* (2013.01); *D06P 1/5285* (2013.01); *Y10T 428/25* (2015.01)

(58) Field of Classification Search
CPC .. B32B 3/22; B32B 3/26; B32B 3/263; B32B 3/30; B32B 27/04; B32B 27/06; B32B 27/08; B32B 27/14; B32B 2260/02; B32B 2260/025; B32B 2260/046; B32B 7/04; B32B 7/06; B32B 2274/00; B32B 2307/418; B32B 3/06; B32B 3/067; B32B 3/08; B32B 3/085; Y10T 428/24174; Y10T 428/24355; Y10T 428/24372; Y10T 428/24405; Y10T 428/24479; Y10T 428/24521; Y10T 428/24529; Y10T 428/24612; Y10T 428/24802; Y10T 428/24851; Y10T 428/24893
USPC ....... 428/141, 143, 144, 147, 156, 161, 162, 428/172, 195.1, 201, 206
See application file for complete search history.

(56) References Cited

U.S. PATENT DOCUMENTS

| | | | |
|---|---|---|---|
| 3,449,201 | A | 6/1969 | Palmquist |
| 5,082,706 | A | 1/1992 | Tangney |
| 5,578,381 | A | 11/1996 | Hamada |
| 5,620,775 | A | 4/1997 | LaPerre |
| 5,645,938 | A | 7/1997 | Crandall |
| 5,888,594 | A | 3/1999 | David |
| 6,040,044 | A | 3/2000 | Takahashi |
| 6,416,856 | B1 | 7/2002 | Crandall |
| 6,989,187 | B2 | 1/2006 | Thomas |
| 7,402,723 | B2 | 7/2008 | Stone |
| 8,634,146 | B2 | 1/2014 | David |
| 2006/0159888 | A1 | 7/2006 | Hebrink |
| 2014/0110043 | A1 | 4/2014 | Wu |
| 2015/0016038 | A1 | 1/2015 | Niu |
| 2015/0343502 | A1 | 12/2015 | Clark |

FOREIGN PATENT DOCUMENTS

| | | | |
|---|---|---|---|
| JP | 2008-033002 | 2/2008 | |
| WO | WO-2014100335 A1 * | 6/2014 | ............ B05D 3/067 |
| WO | WO 2014-190017 | 11/2014 | |
| WO | WO 2015-195433 | 12/2015 | |
| WO | WO 2017-106239 | 6/2017 | |
| WO | WO 2017-172888 | 10/2017 | |

OTHER PUBLICATIONS

International Search Report for PCT International Application No. PCT/US2017/055476, dated Dec. 27, 2017, 4 pages.

* cited by examiner

THERMOFORMABLE BEADED ARTICLES WITH REMOVABLE STABILIZING LAYER AND METHODS THEREOF

CROSS REFERENCE TO RELATED APPLICATIONS

This application is a national stage filing under 35 U.S.C. 371 of PCT/US2017/055476, filed Oct. 6, 2017, which claims the benefit of U.S. Application No. 62/409,439, filed Oct. 18, 2016, the disclosure of which is incorporated by reference in its/their entirety herein.

TECHNICAL FIELD

Thermoformable beaded articles comprising a removable stabilizing layer are discussed along with the thermoformed articles and methods of making such articles, wherein the resulting thermoformed article comprises an exposed textured surface.

BACKGROUND

Designing the tactile experience in consumer facing products has become a popular method to increase consumer satisfaction and improve the user experience. Surface textures that impart unique tactile properties to consumer facing side of product surfaces are broadly known. Examples include personal care products, decorative articles, and touch surfaces, such as those used in electronics devices.

U.S. Pat. No. 6,989,187 (Thomas) discloses an absorbent article with a vacuum formed topsheet having silky tactile impression, where the topsheet has a plurality of boat shaped cells that have a major axis and a minor axis on the body facing surface. The major axes is aligned in the stroking direction.

U.S. Pat. No. 7,402,723 (Stone et al.) discloses polymeric web having a soft and silky tactile impression. The silky feeling side of the web has hair like fibrils with each of the hair-like fibrils being a protrusion from the web surface.

U.S. Pat. No. 5,620,775 (LaPerre) discloses decorative articles that comprise glass beaded surfaces having a low coefficient of friction and a smooth tactility against skin. The smooth tactile feel is due to the apex of the bead heights being at or about the same level despite bead size even though the texture producing particles may have at least 3 wt % glass shards.

U.S. Pat. Publ. No. 2015/0016038 (Niu et al.) describes an electronic device with a reduced friction surface. The reduced friction surface comprises a glass beaded film where the glass beads are arranged so that they line up in a common plane.

WO 2014/190017 (Barnes et al.) describes a bead coated sheet that has a low friction surface. The surface comprises of glass microbeads that are partially embedded in a metal surface where the glass microbeads are greater than 20 micrometers in diameter. It is disclosed that smooth-to-touch surfaces can be made by decreasing the difference in height of the apex of each glass microbead such that they are within 5, 10, 12, 15 or even 20 micrometers.

SUMMARY

Typically in bead films, the bead films are made and then applied to a surface. While great lengths may be taken to provide a surface with a specific surface texture, the specific surface texture may be compromised when the article undergoes further handling, such as a thermoforming step. Thus, there is a need to preserve the specific surface texture or minimize the disruption of the specific surface texture upon heating, forming, and/or molding.

In one aspect, an article is described comprising:
(i) a bead film comprising a binder resin layer and a plurality of microspheres partially embedded in the binder resin layer such that a portion of the microspheres outwardly protrude a first distance from the surface of the binder resin layer;
(ii) a stabilizing layer disposed on the outwardly protruding microspheres opposite the binder resin layer, wherein the stabilizing layer intimately conforms to the outwardly protruding microspheres, and wherein the stabilizing layer has a Tg less than 100° C. and a storage modulus at 150° C. of at least 1.5 MPa; and
(iii) a release agent, wherein (a) the binder resin layer comprises the release agent, (b) the stabilizing layer comprises the release agent, (c) an intermediate layer comprises the release agent or (d) combinations thereof, wherein the intermediate layer is disposed between the monolayer of microspheres and the stabilizing layer, with the proviso that when the binder resin layer has a fluorine content along the polymeric backbone greater than 65 wt %, the stabilizing layer comprises a release agent selected from a silicone and a fluoropolymer.

In another aspect, a method of making an article to be thermoformed at a temperature T1 is described, the method comprising: coating a stabilizing layer to a first surface of a bead film, wherein the bead film comprises a binder resin layer and a plurality of microspheres thereon, wherein the plurality of microspheres are partially embedded in the binder resin layer such that a portion of the microspheres outwardly protrude a first distance from the surface of the binder resin layer to form the first surface of the bead film and wherein the stabilizing layer has a Tg less than T1 and a storage modulus at 150° C. of at least 1.5 MPa; and wherein (i) at least one of the binder resin layer and the stabilizing layer comprises a release agent and/or (ii) an intermediate layer disposed between the first surface and the stabilizing layer comprises a release agent with the proviso that when the binder resin layer has a fluorine content along the polymeric backbone greater than 65 wt %, the stabilizing layer comprises a release agent selected from a silicone and a fluoropolymer.

The above summary is not intended to describe each embodiment. The details of one or more embodiments of the invention are also set forth in the description below. Other features, objects, and advantages will be apparent from the description and from the claims.

DESCRIPTION OF THE FIGURES

Embodiments of the present disclosure are illustrated by way of example, and not limitation, in the accompanying drawings in which.

DETAILED DESCRIPTION

As used herein, the term

"a", "an", and "the" encompass embodiments having plural referents, unless the content clearly dictates otherwise; and "and/or" is used to indicate one or both stated cases may occur, for example A and/or B includes, (A and B) and (A or B).

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

Figure 1:
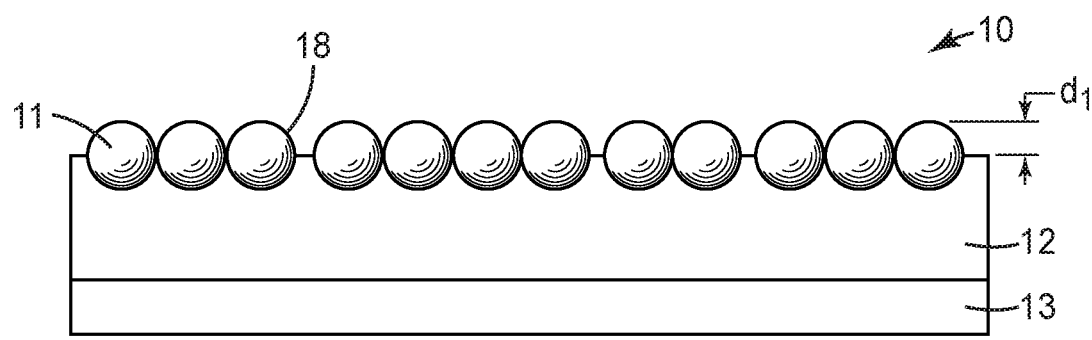
FIG. 1 is a schematic cross-sectional view of a bead film according to one embodiment of the present disclosure.

The present disclosure relates to constructions comprising an exposed surface of microspheres. Such beaded films are shown in FIG. 1, where bead film 10 comprises a plurality of microspheres arranged in monolayer 11. The plurality of microspheres are partially embedded in binder resin layer 12 such that a portion of the microspheres outwardly protrude a first distance, $d_1$, from the surface of the binder resin layer and form first surface 18. In one embodiment, the article comprises the plurality of microspheres embedded in the binder resin layer and the binder resin layer is disposed on a substrate layer 13. In some embodiments, the article may comprise additional layers between the binder resin layer and the substrate as discussed below.

Thermoforming is the ability of an article to be shaped using heat and pressure. The present disclosure is directed toward a stabilizing layer that can be used with bead films during the thermoforming process. It has been observed that by using the stabilizing layer disclosed herein, the beaded films after thermoforming have improved surface properties compared to bead films thermoformed not using the stabilizing layer disclosed herein.

Figure 2:
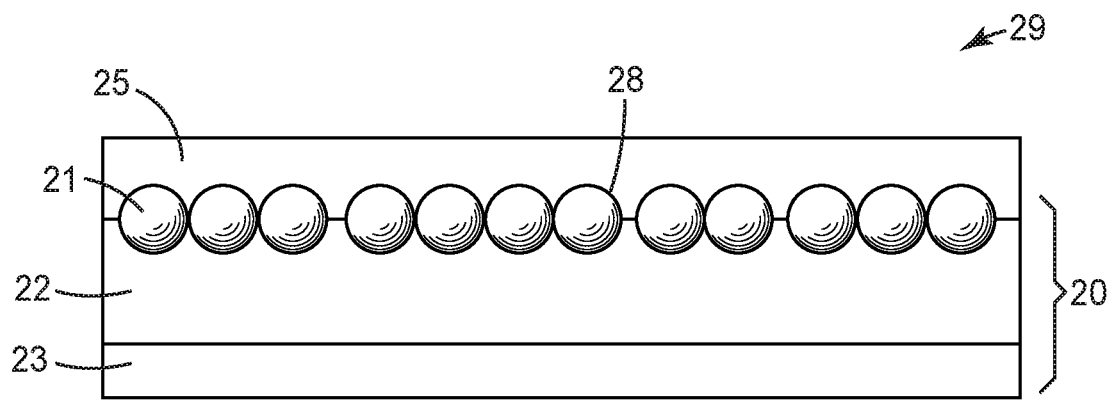
FIG. 2 is a schematic cross-sectional view of an article according to one embodiment of the present disclosure.

A stabilizing layer is disposed on the outwardly protruding microspheres opposite the binder resin layer of the bead film, wherein the stabilizing layer intimately conforms to the protruding microspheres. Such a construction is shown in FIG. 2, wherein bead film 20, comprises a plurality of microspheres 21 partially embedded in binder resin layer 22. Stabilizing layer 25 intimately conforms to first surface 28.

Stabilizing Layer

The stabilizing layer must be thermoformable, meaning that the stabilizing layer must be able to be shaped or stretched using heat and pressure and not be compromised. In other words, the stabilizing layer can bear the elongation that occurs during forming or stretching without failing, cracking, or generating other defects. This can be achieved by using materials that have a temperature at which they undergo melt flow and forming near that temperature. In some cases, chemically crosslinked materials that do not flow can be used, but they are more likely to crack during the elongation. To avoid this cracking, in one embodiment, the crosslink density should be kept low, as can be indicated by a low storage modulus in the rubbery plateau region. In some cases, a physically crosslinked material can be used which has a low storage modulus in the rubbery plateau region at elevated temperatures (e.g., above room temperature, such as 150° C.). Without wishing to be bound by theory, it is believed that when thermoforming bead films, due to the softer nature of the binder resin layer and the temperatures used during thermoforming, there is a potential for the microspheres to move around (for example in bead height and/or location). Thus, a stabilizing layer is used to hold the microspheres in the bead film in place during the thermoforming process.

To ensure thermoformability, the stabilizing layer should have a glass transition temperature (Tg) less than the thermoforming temperature. If the stabilizing layer comprises more than one Tg, than at least one of the Tg's is less than the thermoforming temperature. For example, the difference between the thermoforming temperature and the Tg of the stabilizing layer is at least 50° C., 100° C., 150° C., 200° C., or even 250° C. In one embodiment, the stabilizing layer has at least one Tg that is less than 90° C., 75° C., 50° C., 25° C., 0° C., −30° C., −40° C., −50° C., −75° C., −100° C., or even −150° C. The Tg can be measured using techniques known in the art, for example by dynamic scanning colorimetry or dynamic mechanical analysis.

Not only does the stabilizing layer thermoform with the bead film, but also maintains enough stiffness so that it can be used to hold the plurality of microspheres in place as the bead film is thermoformed. In one embodiment, the stabilizing layer has a storage modulus at 150° C. of at least 1 MPa (megaPascals), 1.5 MPa, 2 MPa, 3 MPa, or even 4 MPa when measured by DMA (dynamic mechanical analysis) as discussed in the Example Section. In one embodiment, the stabilizing layer has a storage modulus at 120° C. of at least 1.5 MPa, 2 MPa, 3 MPa, or even 4 MPa when measured by DMA. In one embodiment, the stabilizing layer has a storage modulus at 200° C. of at least 1 MPa, 1.5 MPa, 2 MPa, or even 3 MPa when measured by DMA.

In one embodiment, the thickness of the stabilizing layer should be greater than the first distance, $d_1$, which is the distance that the microspheres protrude from the binder resin surface. For example, the thickness of the stabilizing layer should be at least $1.1d_1$, $1.5d_1$, $2d_1$, $3d_1$, $5d_1$, $7d_1$, or even $10d_1$.

In one embodiment, the stabilizing layer has a thickness of at least 5, 10, 20, 25, 30, 50, 75, or even 100 micrometers. However, in some embodiments, the thickness of the stabilizing layer should not be so thick, such that it inhibits accurate molding of the bead film. In one embodiment, the stabilizing layer has a thickness of at most 0.1, 0.15, 0.2, 0.3, 0.4, 0.5, 0.75, or even 1 mm (millimeters).

In general, the stabilizing layer must conform to the first surface of the bead film. The stabilizing layer must conform to the protruding plurality of microspheres so that enough of the protruding microsphere surface is covered, allowing the stabilizing layer to hold the plurality of microspheres in place during thermoforming. Further, the stabilizing layer should minimize air gaps between the first surface and the stabilizing layer, which may, during thermoforming, allow the binder resin to flow around the microspheres, causing them to sink further into the binder resin layer. In one embodiment, the conforming stabilizing layer can be achieved by coating the stabilizing layer onto the microsphere layer.

Exemplary stabilizing layers include: drying oil based chemistries, such as Linseed oil, tung oil, dehydrated castor oil, perilla and oiticica oils or refined fish oils; strippable coatings with a film forming base of ethyl cellulose, cellulose acetate butyrate, copolymer of vinyl chloride with vinyl acetate or vinylidene chloride; latex compositions such as those based on styrene-butadiene, styrenic, acrylic or polyvinyl acetate, blends and/or copolymers; bituminous coatings; coatings from cellulose derivatives such as cellulose esters like cellulose nitrate, cellulose acetate, cellulose propionate, cellulose butyrate, cellulose acetate-butyrate, cellulose acetate-propionate or cellulose ethers like ethyl cellulose, methyl cellulose, carboxymethyl cellulose, hydroxyethyl cellulose, benzyl cellulose; phenolic resins including modified phenolics, oil-soluble thermoplastic, oil-soluble heat reactive, or alcohol-soluble; alkyd resins including resin-modified alkyds such as silicone-alkyds, and styrenated-alkyds; polyester resins; amino resins such as urea and melamine resins; vinyl resins such as polyvinyl acetate, polyvinyl chloride, polyvinyl chloride-acetate, polyvinyl alcohol, polyvinyl acetals like polyvinyl formal, polyvinyl acetal, polyvinyl butyral, polyvinylidene chloride and copolymers or polyvinyl ethers; acrylic resins; polystyrene and copolymers; coatings from silicone resins such as coating available under the trade designation "SYLGARD 184 SILICONE ELASTOMER" from Dow Corning Corporation, Midland, Mich.; epoxy coatings; polyamide coatings including those combined with epoxies; polyurethane coatings such as one-component like thermal cured, air cured or moisture cured and two-component polyurethane systems, polyurethane dispersions such as coating available under the trade designation "3M PAINT DEFENDER" from 3M Company, St. Paul, Minn.; polyethylene resin-based coatings, fluorocarbon resin-based coatings, coatings based on synthetic rubbers such as polychloroprene (neoprene), chlorosulfonated polyethylene, styrene-butadiene rubber (SBR), butadiene-acrylonitrile rubber (nitrile rubber), isobutylene-isoprene copolymer (butyl rubber), polysulfide rubber, silicone rubber, polyurethane rubber (TPU—thermoplastic polyurethane), chlorinated rubber, polyacrylic ester rubber, or cyclized rubber.

Release Agent

A release agent must be present to facilitate easy removal of the stabilizing layer from the binder resin layer, leaving the microspheres embedded in the binder resin layer. The release agent may be present in (a) the binder resin layer, (b) the stabilizing layer, (c) an intermediate layer disposed between the monolayer of microspheres and the stabilizing layer or a combination thereof. In one embodiment, the release agent migrates to the surface of the layer to provide the appropriate release properties.

Release agents known in the art may be used. Exemplary release agents include: oils (such as paraffin oil), fatty acids and their salts, fatty acid esters, waxes (such a mineral and vegetable waxes), silicon based polymers, fluorinated materials (such a fluoropolymers), glycols, metallic soaps and combinations of any and all of the above. In one embodiment, the release agent is selected from a silicone, a fluorocarbons, and combinations thereof.

Silicone release agents generally comprise an organopolysiloxane polymer comprising at least two crosslinkable reactive groups, e.g., two ethylenically-unsaturated organic groups. In some embodiments, the silicone polymer comprises two terminal crosslinkable groups, e.g., two terminal ethylenically-unsaturated groups. In some embodiments, the silicone polymer comprises pendant functional groups, e.g., pendant ethylenically-unsaturated organic groups. In some embodiments, the silicone polymer has a vinyl equivalent weight of no greater than 20,000 grams per equivalent, e.g., no greater than 15,000, or even no greater than 10,000 grams per equivalent. In some embodiments, the silicone polymer has a vinyl equivalent weight of at least 250 grams per equivalent, e.g., at least 500, or even at least 1000 grams per equivalent. In some embodiments, the silicone polymer has a vinyl equivalent weight of 500 to 5000 grams per equivalent, e.g., 750 to 4000 grams per equivalent, or even 1000 to 3000 grams per equivalent.

Commercially available silicone polymers include those available under the trade designations "DMS-V" from Gelest Inc., e.g., DMS-V05, DMS-V21, DMS-V22, DMS-V25, DMS-V31, and DMS-V33. Other commercially available silicone polymers comprising an average of at least two ethylenically-unsaturated organic groups include "SYL-OFF 2-7170" and "SYL-OFF 7850" (available from Dow Corning Corporation), "VMS-T11" and "SIT7900" (available from Gelest Inc.), "SILMER VIN 70", "SILMER VIN 100" and "SILMER VIN 200" (available from Siltech Corporation), and 2,4,6,8-tetramethyl-2,4,6,8-tetravinylcyclotetrasiloxane (available from Aldrich).

The release agent may also comprise a fluorosilicone polymer. Commercially available ethylenically unsaturated fluorosilicone polymers are available from Dow Corning Corp, (Midland, Mich.) under the SYL-OFF series of trade designations including, e.g., "SYL-OFF FOPS-7785" and "SYL-OFF FOPS-7786". Other ethylenically unsaturated fluorosilicone polymers are commercially available from General Electric Co. (Albany, N.Y.), and Wacker Chemie (Germany). Additional useful ethylenically unsaturated fluorosilicone polymers are described as component (e) at column 5, line 67 through column 7, line 27 of U.S. Pat. No. 5,082,706 (Tangney). Fluorosilicone polymers are particularly useful in forming release coating compositions when combined with a suitable crosslinking agent. One useful crosslinking agent is available under the trade designation "SYL-OFF Q2-7560" from Dow Corning Corp. Other useful crosslinking agents are disclosed in U.S. Pat. No. 5,082,706 (Tangney) and U.S. Pat. No. 5,578,381 (Hamada et al.).

In one embodiment, the release agent is present in the binder resin layer. Such materials include: fluorine-containing polymers as discussed in the Binder Resin Layer below.

In one embodiment, the release agent is present in the stabilizing layer. Such materials include: "SYLGARD 184 SILICONE ELASTOMER" from Dow Corning Corporation, Midland, Mich.

Figure 3:
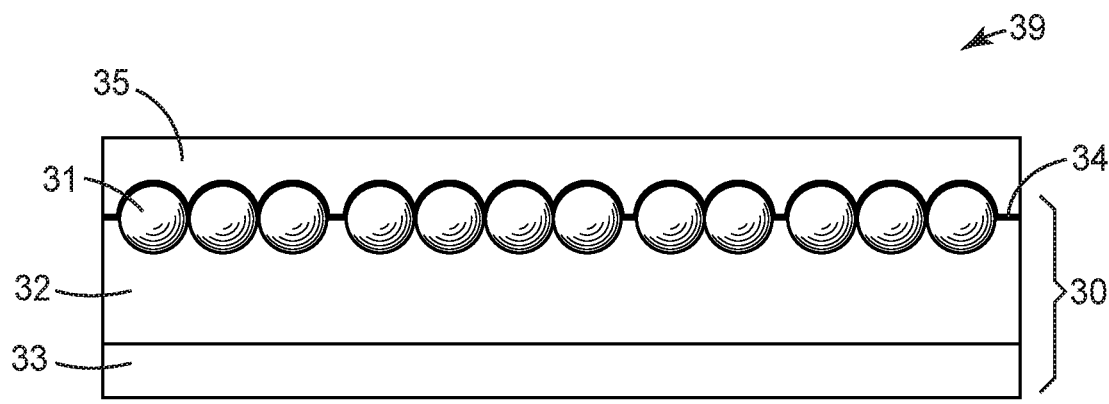
FIG. 3 is a schematic cross-sectional view of an article according to one embodiment of the present disclosure.

In one embodiment, the release agent is present in an intermediate layer disposed between the monolayer of microspheres and the stabilizing layer. Such a construction is depicted in FIG. 3, which shows bead film 30, comprising optional substrate 33, bead resin layer 32, and plurality of microspheres 31, stabilizing layer 35, and intermediate layer 34. As shown in FIG. 3, stabilizing layer 35, intimately conforms to the first surface of bead film 30, which is coated with intermediate layer 34. The intermediate layer is a thin, preferably continuous, layer having a thickness of less than $d_1$, preferably 0.3 $d_1$, 0.2 $d_1$, or even 0.1 $d_1$. In one embodiment, the intermediate layer has a thickness of less than 1000, 500, 200, 100, 50, or even 20 nm. In one embodiment the intermediate layer is a monolayer. Exemplary types of intermediate layers include those known in the art, for example waxes or silicones dispersed in carrier liquids, such as low boiling organic solvents or water. Commercially available materials that may be used as an intermediate layer include those available under the trade designation "E203 ROCKET RELEASE" from Stoner Inc., Quarryville, Pa.; and "UNIVERSAL MOLD RELEASE" from Smooth-On Inc., Macungie, Pa.

The release agent must be stable enough to survive the thermoforming process such that after the thermoforming process, the stabilizing layer is able to be cleanly removable from the surface. To be cleanly removable means that (a) essentially no microspheres are removed from the bead film and (b) there is no remaining stabilizing layer on the plurality of microspheres. If an intermediate layer comprising a release agent is used, there may be some residue of the intermediate layer left on the plurality of microspheres, which may need to be washed off.

In one embodiment, more than one release agent may be present. For example a release agent present may be present in the binder resin layer as well as the stabilizing layer. However, when the binder resin layer has a fluorine content along the polymeric backbone greater than 65 wt %, the stabilizing layer comprises a release agent selected from a silicone, a fluoropolymer, or combinations thereof Bead Films Substrate Layer The substrate layer may provide additional support to the binder resin layer and embedded microspheres during processing and handling. Alternatively or additionally, the substrate layer may be the surface the resulting article protects and/or gives texture to.

Examples of suitable substrate layers include, but are not limited to, those selected from at least one of fabrics (including synthetics, non-synthetics, woven and non-woven such as nylon, polyester, etc.); polymer coated fabrics such as vinyl coated fabrics, polyurethane coated fabrics, etc.; leather; metal; paint coated metal; paper; polymeric films or sheets such as polyethylene terephthalate, acrylics, polycarbonate, polyurethane, elastomers such as natural and synthetic rubber, and the like; and open-cell foams and closed cell foams, including for example, polyurethane foam, polyethylene foam, foamed rubber, and the like. The substrates may, for example, be in the form of a clothing article or footwear; automobile, marine, or other vehicle seat coverings; automobile, marine, or other vehicle bodies; orthopedic devices; electronic devices (including, for example, track pads, and outer surface cover), hand held devices, household appliances; sporting goods; and the like.

In one embodiment, the substrate layer is a thermoformable material, which can enable thermoforming of the resulting article. The substrate should have a glass transition temperature below the thermoforming temperature. In one embodiment, the substrate has a Tg that is at least 50° C., or even 100° C. lower than the thermoforming temperature and no more than 200° C. lower than the thermoforming temperature. In one embodiment, the substrate comprises a material having a glass transition temperature greater than or equal to 60° C., 70° C., or even 80° C.; and less than or equal to 160° C., 150° C., 140° C., 130° C., 120° C., or even 110° C.

In one embodiment, the substrate has a thickness of at least 5, 10, 20, 25, 50 or even 75 micrometers. In one embodiment, the substrate has a thickness of at most 25 mm or even 50 mm.

Binder Resin Layer

The plurality of microspheres are held in place on top of the substrate via a binder resin layer. The binder resin layer is typically an organic polymeric material. It should exhibit good adhesion to the microspheres. It is also possible that an adhesion promoter for the microspheres could be added directly to the binder resin layer itself as long as it is compatible within the process window for disposing the binder resin layer on the surfaces of the microspheres.

Materials useful in the binder resin layer include, but are not limited to those selected from at least one of polyurethanes, polyesters, acrylic and methacrylic acid ester polymers and copolymers, epoxies, polyvinyl chloride polymers and copolymers, polyvinyl acetate polymers and copolymers, polyamide polymers and copolymers, fluorine containing polymers and copolymers, silicones, silicone containing copolymers, elastomers, including synthetic and natural rubbers such as neoprene, acrylonitrile butadiene copolymers, polymer matrix composites, and combinations thereof. In some embodiments, the polymer matrix composites include nanoparticles in resins, fibers in resins, and the like. Combinations can include any combinations of materials, such as interpenetrating networks, dual cure systems, and the like.

In one embodiment of the present disclosure, the binder resin layer of the present disclosure comprises at least one of (i) a resin comprising a fluorine-containing polymer, (ii) a linear resin, (iii) a resin having low crosslink densities, (iv) combinations and blends thereof. As used herein, resin refers to a solid or highly viscous material comprising a polymer, and among other things, additives such as pigments or colorants such as metallic flakes, rheological modifiers, UV stabilizers, antioxidants, etc. Use of such resins in the binder resin layer can enable stain-resistance and/or thermoforming capabilities to the article.

For example, a linear resin or resin having low crosslink densities can be thermoformed, while adding a fluorine-containing polymer (such as for example a linear fluorine-containing polymer such as THV) can impart stain resistance. For example, in a dual cure system, a resin having low crosslink densities, and optionally comprising a fluorinated polymer, is thermoformed and a subsequent crosslinking step is used to generate resin having high crosslink densities, which may provide stain-resistance.

In one embodiment, the binder resin layer resin comprises a fluorine-containing polymer, which can impart stain resistance to the article. In one embodiment, it has been found that stain resistance characteristics may be related to the amount and location of the fluorine atoms in the fluorine-containing polymer of the binder resin layer. For example, improved stain resistance may occur when the fluorine atoms are located along the polymer backbone (i.e., the main chain of the polymer). The amount of fluorine atoms present in the polymer may be calculated by taking into account both the weight ratios of the monomers included as well as the fluorine content by weight of each monomer along its polymerizable chain length, including fluorine atoms that are present on those atoms once removed from the polymerizable chain. As an example, a copolymer of tetrafluoroethylene, hexafluoropropylene, and vinylidene fluoride in a weight ratio of 10:40:50 would have a backbone fluorine content of 67.7%. This was calculated as follows.

Tetrafluoroethylene: $C_2F_4$, molecular weight 100.01, monomeric fluorine content 76.0%, weight ratio 10%;

Hexafluoropropylene: $C_3F_6$, molecular weight 150.02, monomeric fluorine content 76.0%, weight ratio 40%;

Vinylidene fluoride: $C_2H_2F_2$, molecular weight 64.03, monomeric fluorine content 59.3%, weight ratio 50%.

$$(0.1\times0.76)+(0.4\times0.76)+(0.5\times0.593)]\times100=67.7\%.$$

Note that this calculation includes the fluorine atoms on the trifluoromethyl group of hexafluoropropylene since it is only one atom removed from the polymerizable chain of the hexafluoropropylene monomer.

In some embodiments of the present disclosure, the fluorine content along the polymeric backbone of the fluorine-containing polymer is from at least 15%, 20%, 25%, 27%, 30%, or even 40% and at most 76%, 72% or even 70% by weight.

Although there may be fluoropolymer-containing resins which possess the desired fluorine content they may not exhibit the desired level of stain resistance to highly staining materials, such as yellow mustard, at elevated temperature and humidity. Without wishing to be bound by theory, it is believed that those materials in which the fluorine atoms reside solely, or predominately, in pendent side chains or end groups do not exhibit the desired stain resistance characteristics of the articles in one embodiment of the present disclosure. While materials in which the fluorine atoms reside solely, or predominately, in the polymer backbone or within one carbon away from the backbone may provide adequate stain resistance to yellow mustard at elevated temperature and humidity.

In some embodiments, fluorine-containing polymers having certain glass transition temperatures (Tg) are useful in the present disclosure. Without being bound by theory, it is believed that the higher the Tg, the more resistant it is to staining by yellow mustard. In some embodiments, fluorine-containing polymers having a Tg of no more than 150° C., or even 100° C. are useful in the present disclosure.

Fluorine-containing polymers useful in the binder resin layer including, but are not limited to, those selected from at least one of the following: fluoroolefins and fluorourethanes. Fluoroolefins include elastomeric fluoroolefin polymers, thermoplastic fluoroolefin polymers, elastomeric fluoroolefin polymers crosslinked with multifunctional amines, and thermoplastic fluoroolefin polymers crosslinked with multifunctional amines. Fluorourethanes include lightly crosslinked fluorinated polyurethanes. Any combination of these materials may also be used so long as they are miscible in one another. In some embodiments, fluorine-containing polymers useful in the present disclosure may also include other halogens, such as for, example chlorine. An exemplary fluorine-containing polymer useful in the present disclosure includes chloro trifluoroethylene (CTFE). Any combination of these materials may also be used so long as they are miscible in one another.

Examples of useful elastomeric fluoroolefin polymers include, but are not limited to, bromine-containing copolymers of tetrafluoroethylene, hexafluoropropylene, and vinylidene fluoride such as that available under the trade designation 3M DYNEON PEROXIDE CURE FLUOROELASTOMER FPO 3740 from 3M Company, St. Paul, Minn.; and ultra-low viscosity fluoropolymers such as that obtained as an experimental or developmental product under the trade designation 3M DYNEON FLUOROELASTOMER E-20575 from 3M Company, St. Paul, Minn. Examples of useful thermoplastic fluoroolefin polymers include, but are not limited to, copolymers of tetrafluoroethylene, hexafluoropropylene, and vinylidene fluoride such as that available under the trade designation "3M DYNAMAR POLYMER PROCESSING ADDITIVE FX 5912" from 3M Company, St. Paul, Minn.

The fluorine-containing polymers may be used in a resin to form the binder resin layer and lightly crosslinked. Examples of useful fluoropolymers crosslinked with amines include, but are not limited to, thermoplastic fluoroolefins reacted with multifunctional primary amines such as that available under the trade designation "JEFFAMINE T403" from Huntsman Corporation, The Woodlands, Tex., and polyetherimines such as that obtained under the code number 32034100 from ACROS Organics, a subsidiary of Thermo Fisher Scientific, Minneapolis, Minn.

The "System Functionality" is defined as the total moles of equivalents of the reactive groups in a condensation divided by the total moles of the two components. For example, in a polyurethane formation the total moles of equivalents of hydroxyl and isocyanate groups is divided by the total moles of the polyols and the multifunctional isocyanates. In a polyurea formation, the total moles of equivalents of amine and isocyanate groups is divided by the total moles of the polyamines and the multifunctional isocyanates. In order to obtain a resin having a high crosslink density, the system functionality should be greater than 2.4, 3.0, 4.0, 5.0, or even 10, which means it has substantial crosslinking. If the system functionality is 2.0 or less, little or no crosslinking is achieved and the material is typically thermoformable. When the system functionality is between the above mentioned ranges, the resin is lightly crosslinked. Typically, a higher system functionality leads to greater crosslinking and a stiffer system. As used herein "moles of equivalents" refers to the moles of functional groups. Thus, for a polyol it is the moles of equivalents of hydroxyl groups (OH), and for an isocyanate it is the moles of isocyanate groups (NCO). For example, for a diol or diisocyanate, the moles of equivalents would equal two times the moles of the diol or the diisocyanate, respectively. Similarly, for a triol, the moles of equivalents would equal three times the moles of the triol. "Mole fraction of equivalents" for a particular polyol is the ratio of moles of equivalents of that particular polyol divided by the moles of equivalents for all polyols in the combination of polyols. Based on this definition, the sum of the mole fraction of equivalents for all polyols in the combination is 1. The crosslinker has a functionality greater than 2.0, e.g., a functionality of at least 3. In some embodiments, the crosslinker may have a higher functionality, e.g., 4. In some embodiments, the crosslinker is a low molecular weight triol, e.g., glycerol (i.e., propane-1,2,3-triol). Other exemplary crosslinkers include trimethylolpropane, 1,2,6-hexanetriol, and triethanol amine. In some embodiments, a combination of crosslinkers may be used. In some embodiments, the crosslinker is a triisocyanate.

System functionalities of greater than 2.0-2.15 are less crosslinked than those with system functionalities greater than 2.4. Those systems with higher functionality are more crosslinked. The combination of high system functionality with equivalent weight of isocyanate and/or polyols of less than 1000 is preferred for rigid applications.

Generally, the ratio of the moles of equivalents of isocyanate groups over the moles of equivalents of hydroxy groups (NCO/OH) should be approximately 1, e.g., between 0.7 and 1.3, inclusive, and in some embodiments between 0.9 and 1.1, inclusive. If NCO/OH ratio is greater than 1, the crosslink density will increase, leading to higher hardness and lower elongation. If NCO/OH ratio is less than 1, the system will have a lower crosslink density, leading to a softer system and greater elongation. Thus, the exact ratio of NCO/OH can be adjusted to obtain desired mechanical properties. In addition, decreasing the NCO/OH ratio tends to make the system more hydrophilic and will typically have greater moisture vapor transmission, which may be desirable in application benefiting from a "breathable" structure.

In some embodiments, it may be desirable to use an NCO/OH ratio of greater than 1 to ensure complete crosslinking. For example, the polyols are typically hygroscopic and may carry water into the system. This water tends to react quickly with available NCO sites making them unavailable for crosslinking with the hydroxy groups of the polyols. In some embodiments, an NCO/OH ratio of at least 1.02, (e.g., between 1.02 and 1.07, inclusive) and in some embodiments, at least 1.04 (e.g., between 1.04 and 1.06, inclusive) may be used.

In one embodiment, it is preferred that the binder resin layer is not crosslinked (i.e., a linear resin) or are very lightly crosslinked (i.e., a resin having low crosslink densities). With respect to thermoforming an article, lightly crosslinked materials are preferred over highly crosslinked materials because they produce less elastic recovery energy after being deformed in the forming process. Also, lightly crosslinked materials tend to accommodate higher degrees of elongation before failing compared to highly crosslinked materials. In some embodiments, non-crosslinked materials are preferred to give very high degrees of elongation and to withstand deformation at very high temperatures without failing. In some embodiments, lightly crosslinked materials are preferred over non-crosslinked materials to give better resistance to chemicals and resistance to creep and other dimensional instability over time.

Exemplary linear materials include: polyurethanes, polyureas, polyurethane ureas, polyesters, polycarbonate, ABS, polyolefins, acrylic and methacrylic acid ester polymers and copolymers, polyvinyl chloride polymers and copolymers, polyvinyl acetate polymers and copolymers, polyamide polymers and copolymers, fluorine containing polymers and copolymers, silicones, silicone containing copolymers, thermoplastic elastomers, such as neoprene, acrylonitrile butadiene copolymers, and combinations thereof.

Crosslink density is inversely related to the average molecular weight per crosslink point.

In some embodiments for example in the use of acrylates, the cross link density can be calculated as disclosed in U.S. Pat. No. 6,040,044, using the equation:

Average molecular weight between crosslinks=molecular weight of whole resin (m)/number of crosslink points In this equation, the molecular weight of the whole resin is Σ (number of moles of each component incorporated x molecular weight of each component), and the number of crosslink points is Σ[2(number of functional groups in each component−1)×number of moles of each component].

In another embodiment, the number of crosslink points can be calculated as the density of the crosslink points multiplied by the volume of the material. The density of crosslink points can be calculated using the method described in *Macromolecules*, Vol. 9, No. 2, pages 206-211 (1976). One case involves step-growth copolymerizations with arbitrary functional groups of type A with some molecules having more than two functional groups per molecule and functional groups type B with molecules all having two functional groups per molecule. In this case, the density of crosslink points joining m chains, denoted $[X_m]$, can be calculated with the equation:

$$[X_m] = \sum_{f_i=m}^{f_k} [A_{f_i}]_0 P(X_{m,f_i})$$

which is equation 49 in the *Macromolecules* reference. In this equation, $f_i$ is the degree of functionality of a comonomer, $f_k$ is the highest functionality in the system, m ranges from 3 to $f_k$, $[A_{f_i}]_0$ is the initial concentration of comonomers with functionality $f_i$, and $P(X_{m,f_i})$ is the probability that a monomer of functionality $f_i$ acts as a crosslink point for exactly m chains. The total crosslink density, [X], is the sum of all $[X_m]$ from m=3 to $f_k$. The probability $P(X_{m,f_i})$ can be calculated by the equation:

$$P(X_{m,f_i}) = \binom{f_i}{m} P(F_{A^{out}})^{f_i-m}[1 - P(F_{A^{out}})]^m$$

which is equation 45 in the *Macromolecules* reference, where $P(F_{A^{out}})$ is the probability that an arbitrary functional group is not chemically bound to a complementary chemical group attached to an infinite polymer network. This probability can be found by numerically solving the equation:

$$rp^2 \Sigma_f \alpha_f P(F_{A^{out}})^{f_i-1} - P(F_{A^{out}}) - rp^2 + 1 = 0$$

which is equation 22 in the *Macromolecules* reference. In this equation, p is the reaction conversion of the chemical functionalities of type A, r is the molar ratio of functional groups A to functional group B, and $\alpha_f$ is the mole fraction of functional groups on molecules with functionality $f$.

Similar equations are taught in the *Macromolecules* reference that can be used to calculate the number of crosslinking points in other types of chemical systems. These other types of chemical systems include chain addition polymerizations or step-growth copolymerizations involving components having functionality greater than two for two distinct types of functional groups.

In one embodiment, the resins having low cross link densities are those resins comprising lightly crosslinked material having a molecular weight between crosslinks of greater than about 2,800 g/mol, 4,000 g/mol, 10,000 g/mol, 50,000 g/mol, 100,000 g/mol, 200,000 g/mol, 1,000,000 g/mol, or even 20,000,000 g/mol.

The average molecular weight (e.g., number average) per crosslink can be calculated as described above for the highly crosslinked resin. It should be noted that these calculations do not account for moisture introduced into the reaction as a contaminant, which can lower the actual crosslink density compared to the calculated expected crosslink density. In one embodiment, a slight excess of moles of isocyanate functionality can be added relative to the moles of hydroxyl or amine functionality to account for contaminant moisture. Also, these equations do not account for moisture curing that may occur when, for example, excess moles of isocyanate functionality are added relative to the moles of hydroxyl or amine functionality, and this moisture curing can increase the actual crosslink density compared to the expected crosslink density.

In some embodiments, a binder resin layer may comprise a resin that is able to be thermoformed and enable stain resistance in the resulting article. Such a binder resin layer can be derived from an actinic radiation reactive polyurethane dispersion. Such reactive polyurethanes include those materials sold under the trade designations "BAYHYDROL UV XP" and "BAYHYDROL UV" commercially available from Bayer Material Science LLC, Pittsburgh, Pa.; "LUX 250" commercially available from Alberdingk Boley, Greensboro, N.C.; "MIWON MIRAMER WB 2812" commercially available from Miwon Specialty Chemical Co., Ltd., Korea; and "EBECRYL 4150" and "EBECRYL 4250", both commercially available from Allnex.

In one embodiment, the actinic radiation reactive polyurethane is derived from a reaction product of polyester polyol, diisocyanates and/or triisocyanates, and dihydroxy containing carboxylic acid. In some embodiments, a dispersion comprising the actinic radiation reactive polyurethane has a pH of greater than or equal to 6.5. In some embodiments, a dispersion comprising the actinic radiation reactive polyurethane has a pH of less than or equal to 10.0.

In one embodiment, the binder resin layer comprising the actinic radiation reactive polyurethane includes a crosslinker to crosslink the binder resin layer. Useful crosslinkers include polyisocyanates, preferably water dispersible polyisocyanates, and polyaziridines. In some embodiments, blends of aziridines and water dispersible isocyanates are possible. Other crosslinkers, such as carbodiimides and blocked isocyanates, may also be used.

In some embodiments, the actinic radiation reactive polyurethane is blended with a multi-functional acrylate. A variety of different multi-functional acrylates are useful. In some embodiments, it is desirable that the multi-functional acrylates have a high level of functionality and relatively lower molecular weight. Exemplary multi-functional acrylates include: ethoxylated trimethylol propane triacrylate, trimethylol propane triacrylate, pentaerythritol tri/tetracrylate, dipentaerythritolhexaacrylate, and tris(2-hydroxy ethyl) isocyanurate triacrylate. While liquid multi-functional acrylates can be used, solid multi-functional acrylates, such as tris(2-hydroxy ethyl) isocyanurate triacrylate, can also be used and used in an actinic radiation reactive polyurethane dispersion. Acrylate functional polyols are also available from Allnex.

The actinic radiation reactive polyurethane dispersion may be cured to form the bead bond layer, which can result in a highly cross-linked bead bond layer, which can impart stain resistance of the resulting article. Exemplary curing agents include those having latent functionality in that there is at least one type of functionality present in the curing agent that polymerizes in a manner that does not interfere with and is stable in the presence of polymerization of at least one other type of functionality present in the curing agent. For example, curing agents useful in the present disclosure include molecules having at least some functionality useful for condensation curing and at least some functionality useful for free radical polymerization. Condensation polymerizations, such as those using isocyanates, are enhanced by heating. Free radically polymerizable groups, such as (meth)acrylates, are stable within a range of temperatures commonly used for condensation polymerization.

In some embodiments, a photoinitiator is used with the actinic radiation reactive polyurethane. For example, in some embodiments, curing is accomplished by actinic radiation curing of a thermoformed article. Exemplary actinic radiation curing includes curing by exposure of the thermoformed article to an ultra violet (UV) light source, an electron beam source, and the like. In some embodiments, curing is accomplished by thermally initiated curing.

In some embodiments, a resin comprising a fluorine-containing polymer and having a high crosslinking density is used as the binder resin layer, which can impart stain resistance to the resulting article.

In one embodiment, the binder resin layer is made comprises pendent hydroxyl groups which can react with polyisocyanates to build molecular weight through condensation polymerization. The resin is also selected to have free radically polymerizable functionality such as (meth)acrylate groups, so that the presently disclosed materials may be thermoformed and then free radically crosslinked to make a thermoset article. As a result, the surface of the article becomes more rigid leading to higher pencil hardness values and more crosslinked so that solvents and staining agents are less able to penetrate the surface. The use of fluorine-containing polymers as described above (e.g., polymers comprising fluorine along the polymer backbone or within one carbon atom of the backbone) in combination with the free radical crosslinking leads to resistance to staining by mustard and other colored staining agents.

In some embodiments, the resin comprises a partially fluorinated polymer derived from at least one fluorine containing monomer and two or more non-fluorinated monomers having at least one active hydrogen functional group, where at least one, but not all of the active hydrogen functional groups are reacted with at least one curing agent having latent functionality, and where the curing agent comprises polyisocyanate. Such partially-fluorinated polymers may be derived from the structure of Formula (I):

where $R_f$ must be present as 30 mol % to 60 mol % of the polymer; $R_X$ must be present as 5 mol % to 20 mol % of the polymer; and $R_L$ and $R_G$ comprises the remaining mol % of the polymer. In some embodiments, $R_f$ must be present as 30 mol % to 60 mol % of the polymer; $R_X$ must be present as 5 mol % to 15 mol % of the polymer; and $R_L$ and $R_G$ comprises the remaining mol % of the polymer. Further where $R_f$ in Formula (I) is selected from at least one of the following or combinations thereof:

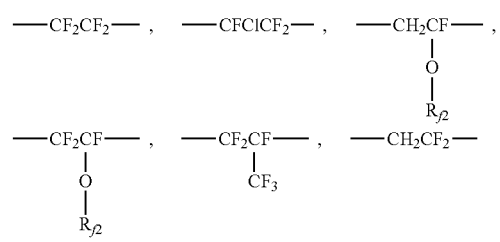

where $R_{f2}$ is fluoroalkyl having 1 to 8 carbon atoms. And also where $R_X$ in Formula (I) is

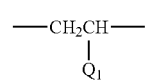

where $Q_1$ is

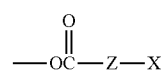

or —O—Z—X where Z is optional, or when present, is selected from an alkylene, arylene, aralkylene or alkarylene, in which any are optionally substituted with N, O or S; and where X is OH, or SH, or $NHR_1$, where $R_1$ is H, alkyl or cycloalkyl having 1 to 22 carbon atoms.

And also where $R_L$ in Formula (I) is

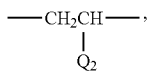

where $Q_2$ is,

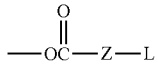

or, —O—Z-L
where Z is optional, or when present, is selected from an alkylene, arylene, aralkylene, or alkarylene, in which any are optionally substituted with N, O or S and
L is

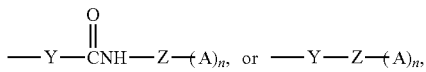

where Y is O, S, $NR_1$, where $R_1$ is H, or alkyl or cycloalkyl having 1 to 22 carbon atoms, and
A is

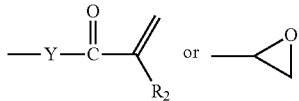

where n is 1 to 5 and $R_2$ is H or $CH_3$.
$R_G$ is

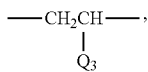

where $Q_3$ is

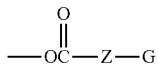

or —O—Z-G
where Z is optional, or when present is selected from an alkylene, arylene, aralkylene, or alkarylene in which any are optionally substituted with N, O or S. and where G is aryl, alkyl, aralkyl or alkaryl.

In any of the foregoing embodiments, units $R_f$, $R_X$, $R_L$, $R_G$ may be arranged head-head, head-tail, tail-head, or tail-tail as in:

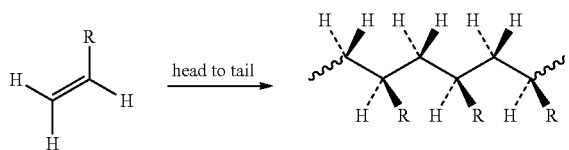

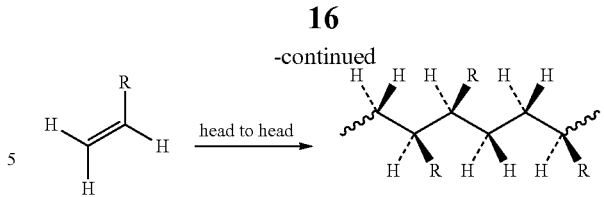

The resin may include chlorotrifluoroethylene (CTFE) polyhydroxy containing polymers such as those available under the trade designation LUMIFLON from Asahi Glass Chemicals American, Bayonne, N.J. In some embodiments, the resin may include nonfluorinated polyols in addition to fluorinated polyols, as long as they are miscible in solution and in the dried and cured products. The binder resin may include monoalcohols, in limited amounts. The monoalcohol may also possess latent functionality, such as acrylate groups (e.g. hydroxyethylacrylate), or be fluorinated to enhance chemical resistance (e.g. N-methyl, N-butanol perfluorobutanesulfonamide).

The resin as described above may be cured to from the binder resin layer. Exemplary curing agents include those having latent functionality in that there is at least one type of functionality present in the curing agent that polymerizes in a manner that does not interfere with and is stable in the presence of polymerization of at least one other type of functionality present in the curing agent. For example, curing agents useful in the present disclosure include molecules having at least some functionality useful for condensation curing and at least some functionality useful for free radical polymerization. Condensation polymerizations and/or thermal catalysis, such as those using isocyanates, are enhanced by heating. Free radically polymerizable groups, such as (meth)acrylates, are stable within a range of temperatures commonly used for condensation polymerization. In some embodiments, useful curing agents include those having isocyanate or epoxy functionality combined with (meth)acrylate functionality. Preferable curing agents useful in the present disclosure include those having isocyanate functionality combined with (meth)acrylate functionality. Examples include 1,1-bis(acryloyloxymethyl) ethyl isocyanate (BEI), isocyanatoethyl acrylate (AOI), and isocyanatoethyl methacrylate (MOI), which may be obtained from CBC America Corp, Commack, N.Y., and DESMOLUX D-100, which may be obtained from Bayer, Pittsburgh, Pa., and LAROMER 9000 available from BASF. When using polyisocyanates as curing agents, these polyisocyanates may also function as crosslinkers, where crosslinking means having two or more isocyanate groups that are capable of reacting with two different polymeric chains.

These curing agents preferably include latent functionality such that the articles can be converted into thermoset articles. For example, in some embodiments, curing is accomplished by actinic radiation curing of the thermoformed article. Exemplary actinic radiation curing includes curing by exposure of the thermoformed article to an ultraviolet (UV) light source. Various photoinitiators can be used in the presently disclosed thermoformed articles. In some embodiments, it is preferable to use photoinitiators having longer wavelength absorption. Alternatively, in some embodiments, curing is accomplished by exposure of the thermoformed article to electron beam irradiation. In some embodiments, curing is accomplished by thermally initiated curing. Photoinitiators useful in the present disclosure include those commercially available under the trade designations "IRGACURE" (e.g. Irgacure 651) and "DAROCURE" (e.g. Darocure 1173) from BASF, Ludwigshafen, DE and "ESACURE" (e.g. Esacure KB1) from Lamberti, Gallarate, IT. Suitable UV curing apparatus and the light sources are well known to those skilled in the art and include for example those commercially available under the trade designation "Fusion" from Heraus Noblelight Fusion UV, Gaithersburg, Md. Crosslinkers useful in the present disclosure include polyisocyanates which are useful for reaction with the microspheres as well as to the pendent hydroxyl groups on the fluorine containing polymer. An examples of such polyisocyanates is given below in Formula (II)

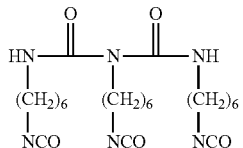

Exemplary compounds of Formula (II) are commercially available. Exemplary compounds of Formula (II) can be obtained from Bayer Polymers LLC (Pittsburgh, USA). One such compound is obtainable under the trade designation DESMODUR N100.

Other exemplary polyisocyanates include those having structures according to the following Formulas (III) and (IV):

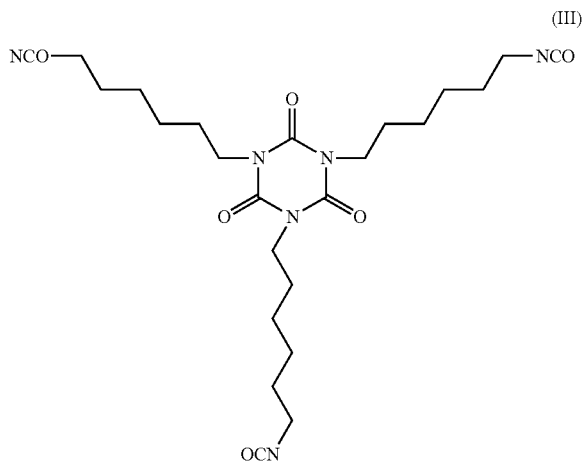

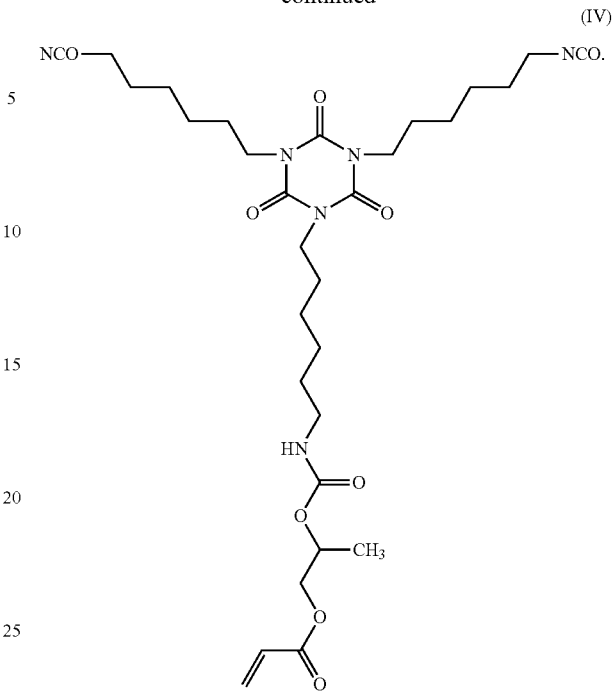

Many of the multifunctional isocyanates of greater than 2 functionality, including that of Formula (III), exist as a distribution of materials. For instance, hexamethylene diisocyanate based isocyanate oligomers such as biuret multi-isocyanates (for instance those available under the trade designation DESMODUR N100) exist as a mixture of hexamethylene diisocyanate, hexamethylene diisocyanate biuret trimers, hexamethylene diisocyanate biuret pentamers, hexamethylene diisocyanate biuret heptamers, and so on. The same is true for hexamethylene diisocyanate based isocyanurate multi-isocyanates (for instance those available under the trade designation DESMODUR N3300). Biuret and isocyanurate multi-isocyanates may be based on other diisocyanates such as isophorone diisocyanate, or toluene diisocyanate. Diisocyanates such as H12MDI (available under the trade designation DESMODUR W, Bayer) may also be employed. Other multifunctional isocyanates which are useful as crosslinkers include those with additional acrylate functionality, for example that commercially available under the trade designation DESMODUR D100 (from Bayer, presently commercially available under the trade designation EBECRYL 4150 from Allnex, Alpharetta, Ga.). DESMODUR D100 has an NCO functionality of about 2 and can act as a crosslinker.

The binder resin layer can be formed, for example, out of solution, aqueous dispersion, or 100% solids coating such as via hot melt, extrusion, or reactive coating. Use of solvent coating or aqueous dispersions can provide advantages such as lower processing temperatures which in turn permits the use of materials such as polyethylene in the transfer polymer layer described below. Lower process temperatures also generally result in decreased thermal stress in the final articles. In addition, the use of certain higher boiling solvents may advantageously provide articles with reduced amounts of entrapped air in the dried and cured binder resin layer.

The binder resin layer may be transparent, translucent, or opaque. It may be colored or colorless. The binder resin layer may, for example, be clear and colorless or pigmented with opaque, transparent, or translucent dyes and/or pigments. In some embodiments, inclusion of specialty pigments, such as for example metallic flake pigments, can be useful.

The binder resin should have a glass transition temperature below the thermoforming temperature. In one embodiment, the binder resin has a Tg that is at least 50° C., or even 100° C. lower than the thermoforming temperature and no more than 200° C. lower than the thermoforming temperature. In one embodiment, the binder resin comprises a material having a glass transition temperature greater than or equal to 60° C., 70° C., or even 80° C.; and less than or equal to 160° C., 150° C., 140° C., 130° C., 120° C., or even 110° C.

In one embodiment, the thickness of the binder resin layer is at least 50% of the average diameter of the microspheres. Exemplary thicknesses for the binder resin layer include: thicknesses of at least 10, 25, 50, 100, or even 250 μm (micrometers) or even more (e.g., at least 1 millimeter, at least 1 centimeter, or even 1 meter).

Microsphere Layer

The microsphere layer comprises a plurality of microspheres. The microspheres useful in the present disclosure comprise glass, glass ceramics, ceramics, polymers, metals, and combinations thereof. Glass is an amorphous material, while ceramic refers to a crystalline or partially crystalline material. Glass ceramics have an amorphous phase and one or more crystalline phases. These materials are known in the art.

In some embodiments, the microspheres are glass beads. The glass beads are largely spherically shaped. The glass beads are typically made by grinding ordinary soda-lime glass or borosilicate glass, typically from recycled sources such as from glazing and/or glassware. Common industrial glasses could be of varying refractive indices depending on their composition. Soda lime silicates and borosilicates are some of the common types of glasses. Borosilicate glasses typically contain boria and silica along with other elemental oxides such as alkali metal oxides, alumina etc. Some glasses used in the industry that contain boria and silica among other oxides include E glass, and glass available under the trade designation "NEXTERION GLASS D" from Schott Industries, Kansas City, Mo., and glass available under the trade designation "PYREX" from Corning Incorporated, New York, N.Y.

The grinding process yields a wide distribution of glass particle sizes. The glass particles are spherodized by treating in a heated column to melt the glass into spherical droplets, which are subsequently cooled. Not all the particles are perfect spheres. Some are oblate, some are melted together and some contain small bubbles.

In one embodiment, the microspheres are plastic particles. The plastic particles selected should comprise a hardness greater than the substrate surface to protect the underlying substrate surface and have a Tg higher than the thermoforming temperature. For example the Tg of the plastic particles is at least 50° C., 100° C., or even 150° C. than the thermoforming temperature. One exemplary plastic particle includes polyurethane, polystyrene, acrylic and methacrylic acid ester polymers and copolymers (e.g., poly(methyl methacrylate)), and polyurea spheres.

In one embodiment, the microspheres comprise a surface modification as is known in the art to improve the adhesion to the binder resin layer. Such treatments include those selected from the group consisting of silane coupling agent, titanate, organo-chromium complex, and the like, to maximize the adhesion of the microspheres to the first polymer layer. Preferably, the coupling agent is a silane such as aminosilane, glyoxide silane, or acrylsilane.

In one embodiment, the treatment level for such coupling agents is on the order of 50 to 700 parts by weight coupling agent per million parts by weight microspheres. Microspheres having smaller diameters would typically be treated at higher levels because of their higher surface area. Treatment is typically accomplished by spray drying or wet mixing a dilute solution such as an alcohol solution (such as ethyl or isopropyl alcohol, for example) of the coupling agent with the microsphere, followed by drying in a tumbler or auger-fed dryer to prevent the microspheres from sticking together. One skilled in the art would be able to determine how to best treat the microspheres with the coupling agent.

In one embodiment, the microspheres of the present disclosure have a Knoop hardness of at least 1,300 kg/mm$^2$, or even 1,800 kg/mm$^2$. The "Knoop hardness" as used herein is an indentation of microhardness measured by using a Knoop indenter; it is a value obtained by dividing the applied load with which a rhombic indentation is formed on the surface of a sample, by the projected area of the indentation computed from the long diagonal of the permanent indentation. The method for measuring the Knoop hardness is described in ASTM C849-88 (2011) "Standard Test Method for Knoop Indentation Hardness of Ceramic Whitewares".

The microspheres for use in the present invention are substantially spherical, for example, having a sphericity of at least 80%, 85%, or even 90%, where sphericity is defined as the surface area of a sphere (with the same volume as the given particle) divided by the surface area of the particle, reported as a percentage.

The microspheres useful in the present disclosure may be transparent, translucent, or opaque.

In another embodiment, the microspheres have a refractive index of less than 1.30, 1.40, 1.49, 1.50, 1.53, 1.55, 1.57, or even 1.60. The refractive index may be determined by the standard Becke line method.

The microspheres are preferably free of defects. As used herein, the phrase "free of defects" means that the microspheres have low amounts of bubbles, low amounts of irregular shaped particles, low surface roughness, low amount of inhomogeneities, low amounts undesirable color or tint, or low amounts of other scattering centers.

In some embodiments, a useful range of average microsphere diameters is at least 10, 20, 25, 40, 50, 75, 100, or even 150 μm (micrometers); at most 200, 400, 500, 600, 800, 900, or even 1000 μm. The microspheres may have a unimodal or multi-modal (e.g., a bimodal) size distribution depending on the application.

The microspheres are typically sized via screen sieves to provide a useful distribution of particle sizes. Sieving is also used to characterize the size of the microspheres. With sieving, a series of screens with controlled sized openings is used and the microspheres passing through the openings are assumed to be equal to or smaller than that opening size. For microspheres, this is true because the cross-sectional diameter of the microsphere is almost always the same no matter how it is oriented to a screen opening.

In some embodiments, to calculate the "average diameter" of a mixture of microspheres one would sieve a given weight of particles such as, for example, a 100 gram sample through a stack of standard sieves. The uppermost sieve would have the largest rated opening and the lowest sieve would have the smallest rated opening.

Alternately, average diameter can be determined using any commonly known microscopic methods for sizing particles. For example, optical microscopy or scanning electron microscopy, and the like, can be used in combination with any image analysis software. For example, software commercially available as free ware under the trade designation "IMAGE J" from NIH, Bethesda, Md.

In one embodiment, the plurality of microspheres have a difference in size distribution not more than 40% (30% or even 20%) based on the average microsphere diameter.

In one embodiment, the bead film may comprise a pattern of microspheres. For example, U.S. Appl. No. 62/269,413 (Clark et al. herein incorporated by reference) discloses a microsphere layer comprising a monolayer of microspheres, wherein the individual microspheres are in periodic pattern and wherein the ratio of microsphere height to center-to-center distance between adjacent microspheres is greater than 0.1 and less than 0.5. U.S. Appl. No. 62/319,174 (Walker et al, herein incorporated by reference) discloses a microsphere layer comprising a monolayer of microspheres, the monolayer of microspheres comprising a first area substantially free of microspheres and a second area comprising a plurality of randomly-distributed microspheres, wherein the monolayer of microspheres comprises a predetermined pattern, the predetermined pattern comprises at least one of (i) a plurality of the first areas, (ii) a plurality of the second areas, and (iii) combinations thereof; plurality of microspheres may comprise a pattern.

Additional Layers

In addition to the substrate, binder resin layer, and microsphere layer previously mentioned, the bead film may also comprise additional layers to impart desirable characteristics into the article.

In one embodiment, a nanoparticle-containing undercoat may be applied between the microsphere layer and the binder resin layer to provide anti-soiling properties as taught in U.S. Pat. Publ. No. 2015-0343502 (Clark et al.), incorporated herein by reference.

In one embodiment, a reinforcing layer is disposed on the surface of the binder resin layer, opposite the microsphere layer. The reinforcing layer can be used to provide advantageous handling characteristics, and in doing so, permit the use of a thinner binder resin layer. Examples of suitable reinforcing layers include polyurethanes resin systems, acrylic resin, polyester resins, and epoxy resins. Suitable polyurethane resin systems include, but are not limited to, those selected from at least one of: polyurethane dispersions, 2 part urethanes coated from solvent, and 100% solids 2 part urethanes. Suitable acrylic resin systems include, but are not limited to, those selected from UV-curable acrylic resin systems and thermally curable acrylic resin systems. Such systems may be solvent coated, aqueous dispersions, or hot melt coated. One suitable type of polyester resin is co-amorphous polyester resins. Suitable epoxy resin systems include, but are not limited to, those selected from at least one of two part and one part epoxy resins.

In one embodiment, the article is thermoformable or stretchable. Thus, it may be advantageous to include layers that can bear the elongation that occurs during forming or stretching without failing, cracking, or generating other defects. This can be achieved by using materials that have a temperature at which they undergo melt flow and forming near that temperature. In some embodiments, the article includes an additional layer which has good capacity for elongation and prevents elastic recovery of the binder resin and/or substrate layer. In one embodiment, this additional layer, disposed between the binder resin layer and the substrate is a material having a glass transition temperature greater than or equal to 60° C. and less than or equal to 150° C., such a material includes an amorphous polyester such as a non-crystalline PET (e.g., amorphous PET, PETG, or polycarbonate).

In one embodiment, the binder resin layer can optionally perform the function of acting as the adhesive for a desired substrate and/or further comprise pigment(s) such that it also has a graphic function.

The binder resin layer, when selected to function also as a substrate adhesive graphic image, may be, for example, pigmented and provided in the form of an image, such as, for example, by screen printing the binder resin layer in the form of a graphic for transfer to a separate substrate. However, the binder resin layer, in some instances, is preferably colorless and transparent so that it can allow transmission of color from either a substrate, separate graphic layers (discontinuous colored polymeric layers) placed below it, or from a separate substrate adhesive that is optionally colored and optionally printed in the form of a graphic image (a discontinuous layer).

Typically, if a graphic image is desired it is provided separately on the surface of the binder resin layer opposite the microsphere layer by at least one colored polymeric layer. The optional colored polymeric layer may, for example, comprise an ink. Examples of suitable inks for use in the present disclosure include but are not limited to those selected from at least one of pigmented vinyl polymers and vinyl copolymers, acrylic and methacrylic copolymers, urethane polymers and copolymers, copolymers of ethylene with acrylic acid, methacrylic acid and their metallic salts, and blends thereof. The colored polymeric layer, which can be an ink, can be printed via a range of methods including, but not limited to screen printing, flexographic printing, offset printing, lithography, transfer electrophotography, transfer foil, and direct or transfer xerography. The colored polymeric layer may be transparent, opaque, or translucent.

Method of Making

Bead films are known in the art. See U.S. Pat. No. 5,620,775 (LaPerre) and U.S. Pat. Publ. No. 2015/0343502 (Clark, et al.). The stabilizing layer and optional intermediate layer are applied atop the outwardly protruding microspheres of the bead film. In one embodiment, the bead film is coated with the stabilizing layer and/or intermediate layer such that it intimately conforms to the first surface of the bead film. Such coating techniques are known in the art including but not limited to, dip coating, roll coating, spray coating, knife coating, gravure coating, extrusion, die-coating, and the like.

After applying the stabilizing layer, the construction may be allowed to dry and/or cure the stabilizing layer.

The constructions comprising the bead film and the stabilizing layer and optional intermediate layer are then thermoformed. Thermoforming techniques are known in the art and may include a single mold, wherein a sheet of thermoformable material is draped over the mold and heat is applied to soften the sheet, causing it to form around/within the mold. Alternatively, a thermoforming press equipped with mutually engageable and disengageable male and female molds can be used, wherein the molds are opened, the sheet of thermoformable material is fed between the molds. The molds are closed and temperature and optionally pressure is used to thermoform the sheet.

Thermoforming may be conducted at temperatures of at least 100° C., 125° C., or even 150° C.; and at most 200° C., 250° C., or even 300° C. Pressures, if used, are typically based on the type of thermoforming done. For example in vacuum forming pressure may range from 50 kPa-150 kPa (7-21 psi); in dual vacuum thermoforming from 50 kPa-500 kPa (7-72 psi); in pressure forming up to 3500 kPa (507 psi) or even higher; and in compression forming up to 7000 kPa (1015 psi) or even higher.

After thermoforming, the stabilizing layer is removed from the bead film. After thermoforming the surface may be cleaned to remove any residual stabilizing and/or intermediate layer. Contact or non-contact methods may be used to remove residuals, including for example, washing with water or solvent, or physically scrubbing the resulting bead film. Typically, the stabilizing layer can be removed by hand, pulling away the stabilizing layer. Ideally, little to no microspheres are removed during this process.

Resulting Bead Films

Figure 4A:
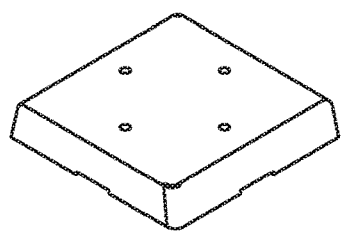
FIG. 4A is a front perspective view of one embodiment of a male molding piece used to thermoform the article of the present disclosure.
Figure 4B:
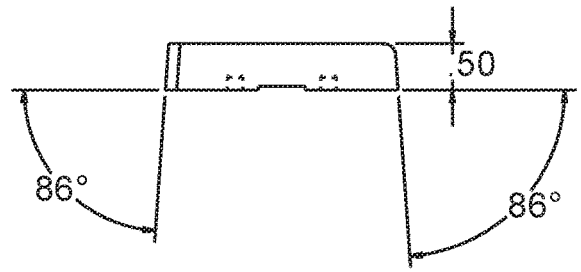
FIG. 4B is a side cross section view of a male molding piece used to thermoform the article of the present disclosure.
Figure 4C:
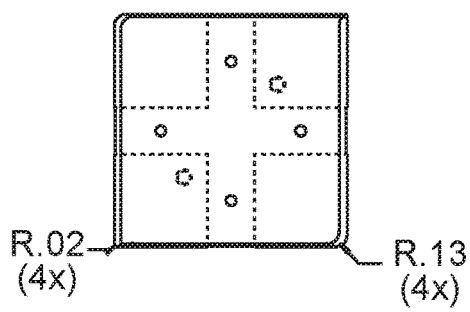
FIG. 4C is a top plan view of one embodiment of a male molding piece used to thermoform the article of the present disclosure.
Figure 4D:
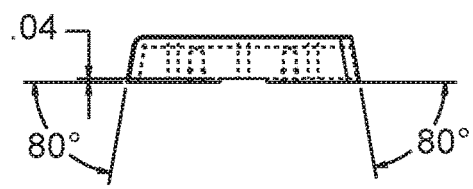
FIG. 4D is a side cross section view of a male molding piece use to thermoform the article of the present disclosure.
Figure 4E:
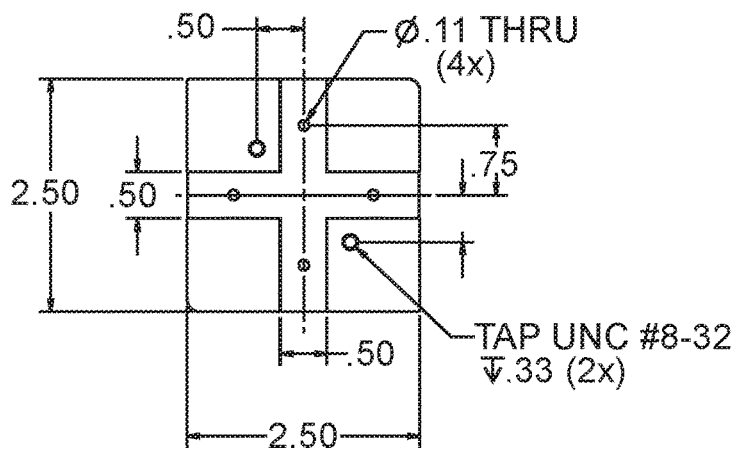
FIG. 4E is a top plan view of a male molding piece used to thermoform the article of the present disclosure (units (not shown) in FIG. 4 are in inches)

The resulting bead films of the present disclosure are thermoformed meaning that they are no longer planar, for example, having at least a 1, 3, 5 or even 10 degree angle from planar. The surface of the bead film comprises outwardly protruding microspheres. Articles made according to the present disclosure are thermoformable articles. In one embodiment, the article of the present disclosure has an elongation percent at failure of greater than 26%, 40% 50%. The present disclosure contemplates thermoformable articles useful across a range of shapes, sizes, and configurations. In some embodiments, the thermoformable and/or thermoset articles are substantially flat. In the course of thermoforming, some articles may be deformed and permanently strained or stretched. In some embodiments, the thermoformable and/or thermoset articles are 3 dimensional. In some embodiments, the corners or edges can have sharp angles, such as 90 degree angles or more acute. Without wishing to be bound by theory, it is believed that the strain on the materials used to make these types of 3 dimensional articles can vary depending on the shape and dimensions of the article. For example, a 3 dimensional article made using the form as shown in FIG. 4A has a 40 to 50% strain at the base of the five sided box. In some embodiments useful in the present disclosure, the thermoformable and/or thermoset articles have more gradual contours, such as, for example, sloped or curved edges. Without wishing to be bound by theory, it is believed that the strain on these more gradual contoured 3 dimensional articles is lower than the aforementioned 3 dimensional articles. For example, strains in the range of 10 to 20% strain may be observed in articles having more gradual contours.

The other criterion for the article to be thermoformable is that it can bear the elongation that occurs during forming or stretching without failing, cracking, or generating other defects. As mentioned above, the crosslink density of the crosslinked materials should be kept low to avoid cracking during the elongation. The expected degree of crosslinking can be approximated as the inverse of the average molecular weight per crosslink, which can be calculated based on the components of a material. In addition, for materials having some crosslink density, it is preferred to do the forming at relatively low temperatures, since as temperatures increase above the glass transition temperature of crosslinked materials, their capacity for elongation begins to decrease.

In one embodiment, the exposed surface of microspheres surface is durable, meaning that it has abrasion and/or scratch resistance. Abrasion resistance, can be measured using a rotary Taber abraser and visually inspecting the samples for damage. The scratch resistance can be measured by pencil hardness. In other words, at which hardness the pencil scratches the surface. In one embodiment, the bead films of the present disclosure have a pencil hardness value of at least 6H, 8H, or even 10H at a force of 2.5 Newtons. In one embodiment, the articles of the present disclosure have a pencil hardness value of at least 3H, 5H, 6H, 8H, 9H, or even 10H at a force of 7.5 Newtons.

The resultant bead films of the present disclosure may or may not be retroreflective. Retroreflectivity of an article can be expressed in terms of its coefficient of retroreflectivity ($R_a$)

$$R_a = E_r * d^2 / E_s * A$$

where:
$E_r$=illumination incident upon the receiver
$E_s$=illumination incident upon a plane perpendicular to the incident ray of the specimen position, measured in the same units as $E_r$
d=distance from the specimen to the projector
A=area of the test surface The coefficient of retroreflectivity ($R_a$) is further described in U.S. Pat. No. 3,700,305 (Bingham). In one embodiment, the articles of the present disclosure are not retroreflective. In one embodiment, the articles of the present disclosure have a coefficient of retroreflection of less than or equal to 10, 5, 1, 0.5, or even 0.3 candelas/lux/square meter measured at 0.2° observation angle and 5° entrance angle following ASTM E810-03(2013) "Standard Test Method for Coefficient of Retroreflection of Retroreflective Sheeting Utilizing the Coplanar Geometry".

In one embodiment, the surface of the bead film may be analyzed by surface profilometry, to examine the surface. Described in the Example Section is a method of surface profilometry, wherein envelope Rq and envelope Rp are reported. The envelope $R_q$ is the standard deviation of the height values of the surface envelope defined by the apex of the microspheres and envelope $R_p$ is the maximum peak height of the microspheres. Lower values means of $R_p$ and $R_q$ indicated that the surface is more uniform. The $R_t$ value is the peak to valley difference calculated over an evaluation length, and the $S_m$ value is the mean peak spacing between profile peaks at the mean line. In one embodiment, the resultant bead films of the present disclosure have a surface texture that has an envelope Rq of less than 3.0, 2.75, 2.5, or even 2.0 micrometers. In one embodiment, the resultant bead films of the present disclosure have a surface texture that has an envelope Rp of less than 8.0, 7.5, 6.5, 6.0, 5.5, or even 5.0 micrometers.

When determining the surface characteristics of the presently disclosed major textured surface, it is useful to define top surface envelope. The top surface envelope describes the part of the major textured surface that a user's finger would contact. Envelope Rq represents the root mean squared (RMS) roughness, or the standard deviation of the height values of the surface envelope defined by the tops of the protrusions. The following formula can be used to calculate Rq:

$$R_q = \sqrt{\frac{\sum_{i=1}^{n}(Z_i - \overline{Z})^2}{n}}$$

where $Z_i$ is the height of the top of the protrusion, $\overline{Z}$ is the mean height of all the protrusions and n is the total number of protrusions analyzed.

Envelope Rp is the maximum peak height or the height difference between the mean of the surface defined by the tops of all the protrusions, $\overline{Z}$, and the top of the highest protrusion in the chosen evaluation region, max(Z). The following formula can be used to calculate Rp:

$$R_p = \max(Z) - \overline{Z}$$

Rt is the peak to valley height difference calculated over an evaluation length, and is an indicator of the average height of the surface protrusions.

In some embodiments, in the resulting article of the present disclosure, the microspheres are about 10 to 75 micrometers wide. In some embodiments, the centers of the microspheres are a distance of about 25 to 100 micrometers from each other. In some embodiments, the major textured surface comprises between about 200 and 1000 microspheres per square millimeter.

In some embodiments, the resulting article of the present disclosure comprises a major textured surface also includes some smooth surface domains. These smooth surface domains can be bounded by textured domains within the major textured surface. Alternately, these smooth surface domains can be positioned along the perimeter or edges of the article. In some embodiments, the presently disclosed textured surface can include both options of smooth surface domains bounded by textured domains within the major textured surface and smooth surface domains placed along the edges or perimeters of the bead film.

In the resulting articles of the present disclosure, the plurality of microspheres are partially embedded into the binder resin layer, which means that the microspheres are located approximately at least 50%, 60%, 70% or even 80% of the microsphere diameter into the binder resin layer, however, a portion of each of the microspheres projects outwardly from the surface of the binder resin layer to provide among other things, durability, abrasion resistance, and/or a low coefficient of friction. In one embodiment, at least 10% or even 20% of the microsphere diameter protrude from the binder resin layer surface. In one embodiment, the apexes of the microspheres on average protrude at least 5, 10, 20, 30, 40, or even 50 micrometers from the binder resin layer surface.

In the resulting articles of the present disclosure, the plurality of microspheres cover more than 10, 15, 20, or even 25%; and less than 30, 40, 45, 50, 55, 60%, 70%, 75%, or even 80% of the surface of the binder resin layer.

The resulting article of the present disclosure has a coefficient of friction of less than 0.3 or even 0.2. The coefficient of friction can be measured, for example, following ASTM D1894 2014 "Standard Test Method for Static and Kinetic Coefficients of Friction of Plastic Film and Sheeting". For example, a table top peel tester (such as Model 3M90, available from Instrumentors Inc., Strongsville, Ohio) can be used in the coefficient of friction mode to pull a test article across the glass surface at a rate of about 2.29 meters/minute (90 inches/minute) for at least about 5 seconds, wherein the surface comprising the plurality of microspheres contacts the glass surface. The transducer can be calibrated with the force from the weight of the steel substrate with foam as 1.00. In this way pulling forces can be directly read out as coefficient of friction (COF). The dynamic (kinetic) coefficient of friction can be determined by evaluating the graph of the COF values beginning one second after the start of the measurement.

Exemplary embodiments of the present disclosure include, but are not limited to the following.

Embodiment 1

An article comprising:
(i) a bead film comprising a binder resin layer and a plurality of microspheres partially embedded in the binder resin layer such that a portion of the microspheres outwardly protrude a first distance from the surface of the binder resin layer;
(ii) a stabilizing layer disposed on the outwardly protruding microspheres opposite the binder resin layer, wherein the stabilizing layer intimately conforms to the protruding microspheres, and wherein the stabilizing layer has a Tg less than 100° C. and a storage modulus at 150° C. of at least 1.5 MPa; and
(iii) a release agent, wherein (a) the binder resin layer comprises the release agent, (b) the stabilizing layer comprises the release agent, and/or (c) an intermediate layer comprises the release agent, wherein the intermediate layer is disposed between the monolayer of microspheres and the stabilizing layer, with the proviso that when the binder resin layer has a fluorine content along the polymeric backbone greater than 65 wt %, the stabilizing layer comprises a release agent selected from a silicone and a fluoropolymer.

Embodiment 2

The article of embodiment 1, wherein the stabilizing layer comprises at least one of a silicone, a fluoropolymer, and a urethane.

Embodiment 3

The article of any one of the previous embodiments, wherein the stabilizing layer has a thickness at least 1.1 times the first distance.

Embodiment 4

The article of any one of the previous embodiments, wherein the intermediate layer has a thickness less than ½ of the first distance.

Embodiment 5

The article of any one of the previous embodiments, wherein the release agent comprises at least one of: silicone, and fluoropolymer.

Embodiment 6

The article of any one of the previous embodiments, wherein the binder resin layer comprises at least one of (i) a resin comprising a fluorine-containing polymer, (ii) a linear resin, (iii) a resin having low crosslink densities, and (iv) combinations and blends thereof.

Embodiment 7

The article of embodiment 6, wherein the fluorine-containing polymer is selected from at least one of the following: fluoroolefins, fluorourethanes, and combinations thereof.

Embodiment 8

The article of any one of embodiments 6-7, wherein the fluorine-containing polymer is derived from aqueous dispersions selected from at least one partially fluorinated monomer, at least one non-fluorinated monomer, and combinations thereof.

Embodiment 9

The article of any one of embodiments 6-8, wherein the fluorine-containing polymer is a copolymer derived from tetrafluoroethylene, hexafluoropropylene, and vinylidene fluoride.

Embodiment 10

The article of embodiment 6, wherein the resin having low cross link densities are those resins comprising lightly crosslinked material having a molecular weight per crosslink point of greater than about 2,800 g/mol.

Embodiment 11

The article of embodiment 6, wherein the linear resin comprise at least one of the following linear materials: polyurethanes, polyureas, polyurethane ureas, polypolyesters, polycarbonate, ABS, polyolefins, acrylic and methacrylic acid ester polymers and copolymers, polyvinyl chloride polymers and copolymers, polyvinyl acetate polymers and copolymers, polyamide polymers and copolymers, fluorine containing polymers and copolymers, silicones, silicone containing copolymers, thermoplastic elastomers, and combinations thereof.

Embodiment 12

The article of any one of the previous embodiments, wherein the refractive index of the microspheres is less than 1.6.

Embodiment 13

The article of any one of the previous embodiments, wherein the microspheres have a sphericity of at least 80%.

Embodiment 14

The article of any one of the previous embodiments, wherein the microspheres have a size difference of no more than 40%.

Embodiment 15

The article of any one of the previous embodiments, wherein the microspheres are transparent.

Embodiment 16

The article of any one of the previous embodiments, wherein the microspheres have an average diameter of 20 to 200 micrometers.

Embodiment 17

The article of any one of the previous embodiments, wherein the monolayer of microspheres comprises the microspheres arranged in a pattern.

Embodiment 18

A thermoset article derived from the articles of any one of the previous embodiments.

Embodiment 19

The thermoset article of embodiment 18, wherein the thermoset article is a 3-dimensional shaped thermoset article.

Embodiment 20

A method of making an article to be thermoformed at a temperature T1, the method comprising:
    coating a stabilizing layer to a first surface of a bead film, wherein the bead film comprises a binder resin layer and a plurality of microspheres thereon, wherein the plurality of microspheres are partially embedded in the binder resin layer such that a portion of the microspheres outwardly protrude a first distance from the surface of the binder resin layer to form the first surface of the bead film and wherein the stabilizing layer has a Tg less than T1 and a storage modulus at 150° C. of at least 1.5 MPa; and wherein (i) at least one of the binder resin layer and the stabilizing layer comprises a release agent and/or (ii) an intermediate layer disposed between the first surface and the stabilizing layer comprises a release agent with the proviso that when the binder resin layer has a fluorine content along the polymeric backbone greater than 65 wt %, the stabilizing layer comprises a release agent selected from a silicone and a fluoropolymer.

Embodiment 21

The method of embodiment 20, further comprising thermoforming the coated bead film at the T1 temperature.

Embodiment 22

The method of any one of embodiments 20-21, further comprising removing the stabilizing layer after thermoforming.

Embodiment 23

The method of embodiment 22, wherein the article has an envelope Rq of less than 3.0.

Embodiment 24

The method of any one of embodiments 22-23, wherein the article has an envelope Rp of less than 7.5.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; St. Louis, Mo., or known to those skilled in the art unless otherwise stated or apparent.

These abbreviations are used in the following examples: BCM/in$^2$=billion cubic microns per square inch, cc=cubic centimeter, cm=centimeter, ft=feet, g=gram, Hg=mercury, min=minute, m=meter, mm=millimeter, rpm=revolutions per minute, pbw=parts by weight, ppm=parts per million, s=seconds, psi=pressure per square inch.

Materials

TABLE 1

Materials

| Designation | Description |
| --- | --- |
| IRGACURE 651 | 2,2-Dimethoxy-1,2-diphenylethan-1-one, available under the trade designation IRGACURE 651 from BASF Corporation, Vandalia, IL. |
| PCPBT | A film based on a polycarbonate/polyester blend, having a thickness of 0.007 inches (178 micrometers), available under the trade designation BAYFOL CR 6-2 000000 from Bayer Material Science Deerfield MA. Prior to use the film was plasma treated generally as described in U.S. Pat. No. 8,634,146 at column 13, line 65 to column 14, line 30, with the following modifications: the width of the drum electrode was 42.5 inches (108 centimeters); the tetramethyl silane deposition step was not employed; during the treatment step 1000 standard cubic centimeters of nitrogen was used in place of oxygen, and the operating pressure was 90 milliTorr, and a plasma treatment time of 30 seconds was used. |
| PC | A clear polycarbonate film having a thickness of 0.005 inches (127 micrometers) and a glass transition temperature of 153° C., available under the trade designation LEXAN 8010 from SABIC Innovative Plastics, Pittsfield, MA. Unless otherwise stated, the film was plasma treated in the same manner as described for PCPBT above. |
| A1100 | gamma-Aminopropyltrimethoxysilane, a clear liquid coupling agent available under the trade designation SILQUEST A1100 from Momentive Performance Materials Incorporated, Columbus, OH. |
| N3300A | A solvent free, polyfunctional, aliphatic isocyanate resin based on hexamethylene diisocyanate (HDI) having an equivalent weight of approximately 193, an NCO content of 21.8%, and a monomeric HDI content of 0.2% maximum, available under the trade designation DESMODUR N3300A from Covestro, LLC, Pittsburgh, PA. |
| DES W | A liquid cycloaliphatic diisocyanate, dicyclohexylmethane diisocyanate, having an equivalent weight of 132 maximum, an NCO content of 31.8% minimum, and a solidification point of 25° C., available under the trade designation DESMODUR W from Covestro, LLC, Pittsburgh, PA. |
| XP2617 | A largely linear NCO prepolymer based on hexamethylene diisocyanate with a NCO content of 12-13% available under the trade designation DESMODUR XP 2617 from Covestro, LLC, Pittsburgh, PA. |
| MOI | A liquid, isocyanate and methacrylate functional resin, 2-methacryloyloxyethyl isocyanate, having an equivalent weight of 155 grams/equivalent, available under the trade designation KARENZ MOI, from Showa Denko, imported by CBC America Commack, NY. |
| D100 | An unsaturated, aliphatic isocyanate based, urethane acrylate having an NCO content of 12.8% and a viscosity of 10000 centipoise at 23° C., available under the trade designation DESMOLUX D 100 from Allnex USA Incorporated, Alpharetta, GA. |
| FX5912 | A free-flowing, granular, fluorothermoplastic processing aid having a melting point of 110-126° C. and based on a copolymer of tetrafluoroethylene, hexafluoropropylene, and vinylidene fluoride, available under the trade designation 3M DYNAMAR Polymer Processing Additive FX 5912 from 3M Company, St. Paul, MN. |
| MEK | Methyl ethyl ketone, having no more than 0.05 wt % of water. |
| MIBK | Methyl isobutyl ketone |
| TERATHANE 650 | Polytetramethylene ether glycol, a waxy solid having a molecular weight of 625-675 grams/mole, a hydroxyl number of 166-180 milligrams KOH/gram resin, and a melting point of 11-19° C., available under the trade designation TERATHANE 650 from Invista™, Wichita, KS. |
| 1,4 BUTANEDIOL | A liquid diol having a molecular weight of 90 grams/mole and a boiling point of 23° C., available as 1,4-butanediol from Chemtura Corporation, Middlebury, CT. |

TABLE 1-continued

Materials

| Designation | Description |
| --- | --- |
| TINUVIN 405 | A solid, triazine-based UV absorber available under the trade designation TINUVIN 405 from BASF Catalysts LLC, Wyandotte, MI. |
| GK-570 | A 65 wt % solids solution in n-butyl acetate of a copolymer of tetrafluoroethylene and vinyl monomers, having a hydroxyl number of 55-65 milligrams KOH/gram resin, available under the trade designation ZEFFLE GK 570 from Daikin America, Orangeburg, NY. This is believed to contain 25-40 wt % fluorine by weight, and have a number average molecular weight ($M_n$) of approximately 9500 grams/mole based on analysis by gel permeation chromatography (GPC) using polystyrene standards. |
| T12 | Dibutyltin dilaurate (DBTDL), a liquid catalyst, available under the trade designation DABCO T-12 from Air Products and Chemicals, Incorporated, Allentown, PA. |
| SYLGARD 184 | A colorless, two part silicone in a 10:1 mix ratio (Part A to Part B), that cures to a flexible elastomer, available under the trade designation SYLGARD 184 SILICONE ELASTOMER from Dow Corning Corporation, Midland, MI. |
| 3M PAINT DEFENDER | A spray applied paint protection coating for automotive applications available under the trade designation 3M PAINT DEFENDER, from 3M Company, St. Paul, MN |
| ETHYL ACETATE | Ethyl acetate having no more than 0.05 wt % of water. |
| 3M VINYL TAPE 471+ | Conformable vinyl tape with a versatile rubber adhesive having a thickness of 0.13 millimeters (0.005 inches) under the trade designation 3M VINYL TAPE 471+, from 3M Company, St. Paul, MN. |
| BOROSILICATE GLASS POWDER | Milled borosilicate glass powder having a size distribution of less than 200 mesh and density of 2.23 grams/cubic centimeters, and a refractive index of 1.476, available under the trade designation PYREX 7740 from Strategic Materials Incorporated, Houston TX. |
| C590 | A polycarbonate diol having a molecular weight of 500 grams/mole and a hydroxyl number of 224 milligrams KOH/gram resin, available under the trade designation C590 from Kuraray America Incorporated, New York, NY. |
| MPD | An aliphatic diol, 3-methyl-1,5-pentanediol, having a molecular weight of 118 grams/mole, available under the trade designation MPD from Kuraray America Incorporated, New York, NY. |
| POLYETHYLENE PELLETS | A low density polyethylene available under the trade designation "PETROTHENE NA214000" from LyondellBasell Co., Rotterdam, Netherlands. |

Test Methods

For samples that had a stabilizing layer on top of the microspheres, the stabilizing was peeled off by hand after processing and before any surface profilometry measurements were made on film cut from the center of the side of the thermoformed box unless otherwise stated.

Surface Profilometry Measurements

Roughness parameters used to describe a textured surface were determined by making measurements of the entire surface topography using the following steps.

1. Collection of Surface Topography

Topographic measurements were made using a Stylus Profilometer, Dektak 8 (Veeco Instruments Incorporated, Tucson, Ariz.) using a 2.5 micrometer radius tip and 2 milligrams of force. The topographical maps generated were composed of 361 line scans spread equally over 2 millimeters in the y-scan direction. Each line was 2 millimeters long in the x-scan direction and included 6000 data points. Samples were at least 1 centimeter square, without rough edges and mounted on microscopy slides, with double-sided permanent adhesive tape.

2. Initial Processing of Surface Topography

An x-average filter was applied to the profilometry data collected in step 1 to remove small variations in the z-position between sequential scan lines. Then a tilt-removal operation was performed to level the topographic map, and the processed map was saved.

3. Determination of Top Surface Envelope

The data from step 2 was analyzed using the following routines in MATLAB software (MathWorks, Incorporated, Natick, Mass.).

a. Rescale Data

A bicubic interpolation method, imresize.m was applied to the maps to provide equal aspect ratio data points.

b. Subdivided Topographic Map

The 2 millimeter×2 millimeter map was divided into four 1 millimeter×1 millimeter submaps for further analysis.

c. Calculate Surface Curvature Map

A surface curvature map was generated as follows.

Figure 5:
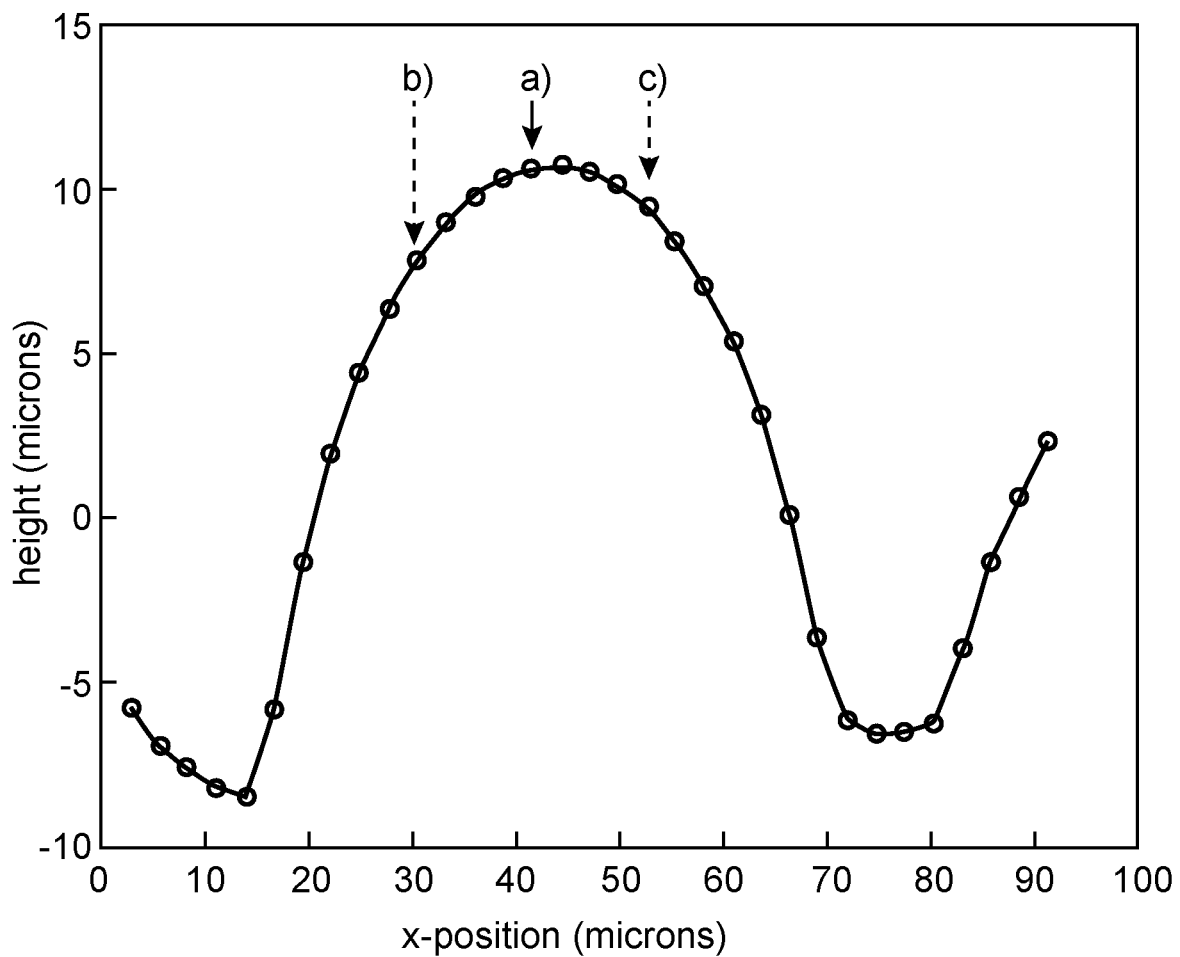
FIG. 5 is an illustrative line profile across the textured surface of a bead film.

1. The curvature was measured within approximately 10 micrometers on either side of each pixel. This is illustrated in FIG. 5 where the pixel of interest is point a), and the curvature is calculated between points b) and c).

Figure 6:
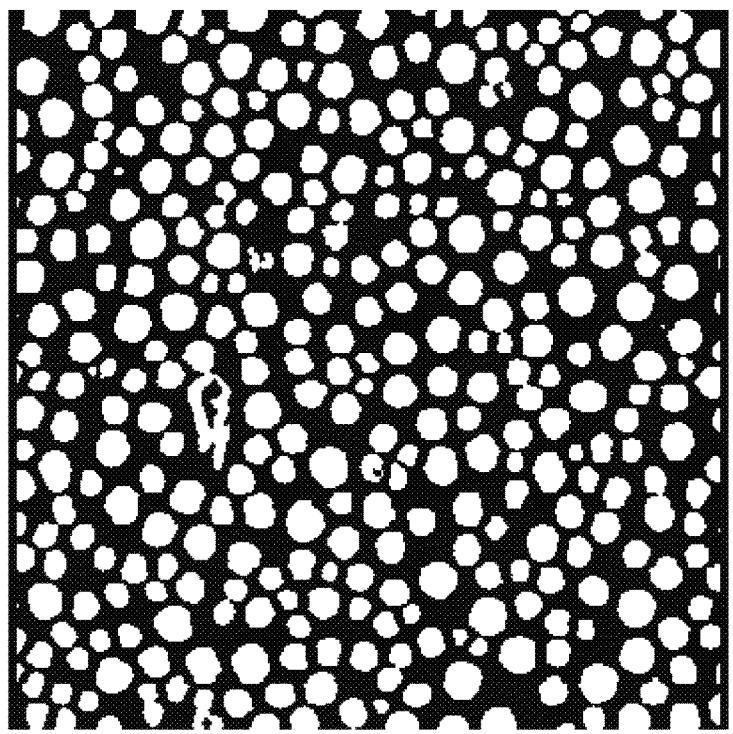
FIG. 6 is a map of x-curvature of a textured surface.
Figure 7:
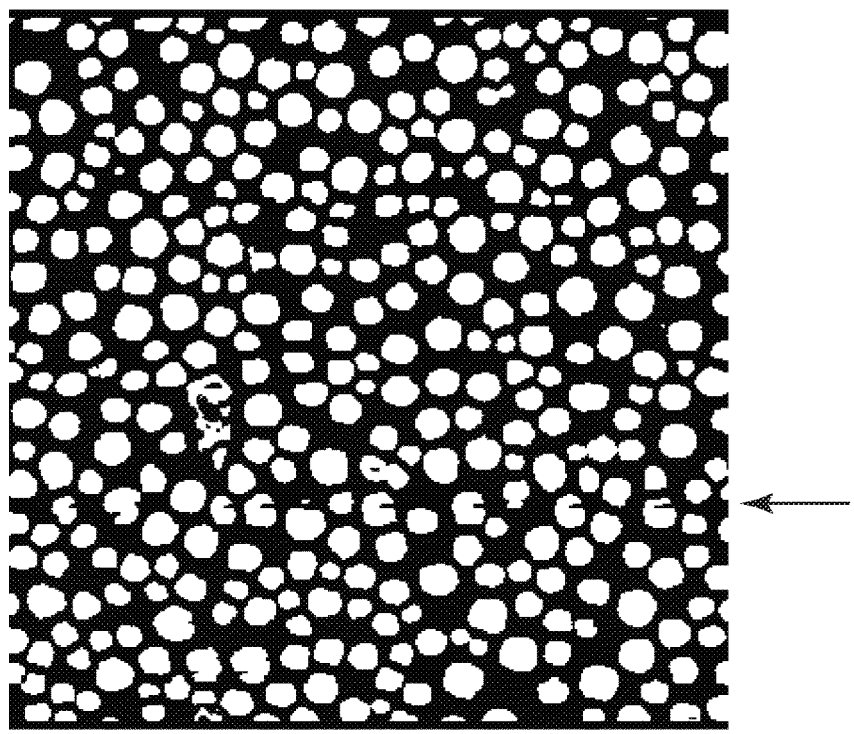
FIG. 7 is a map of y-curvature of a textured surface where the arrow indicates an articfactual row of pixels.

2. After the curvature for a pixel was calculated, two conditions were applied: a) was the curvature less than −0.002 l/micrometers (meaning the curvature is downwards (i.e., concave), and the absolute radius of curvature less than 500 micrometers), and b) was the pixel above the mean plane of the surface topography. Satisfying these two conditions indicated that the pixel was near the top of a feature and thus exposed to contact by a user. This measurement was performed in both the x- and y-directions (FIGS. 6 and 7), and the combined map of the two curvature maps was determined (where each pixel satisfied the height condition, and the curvature condition in each direction).
3. Image processing was performed first using median filtering, with a 3 pixels by 3 pixels window, followed by a morphological open (disk radius=1 pixel) and then a morphological close (line length of 3 pixels, oriented in the y-direction) to remove artifacts such as the row indicated by the arrow in FIG. 7).
4. The individual features identified were then further analyzed according to steps 5-7 below.

d. Calculate the Top Surface Envelope

Figure 8:
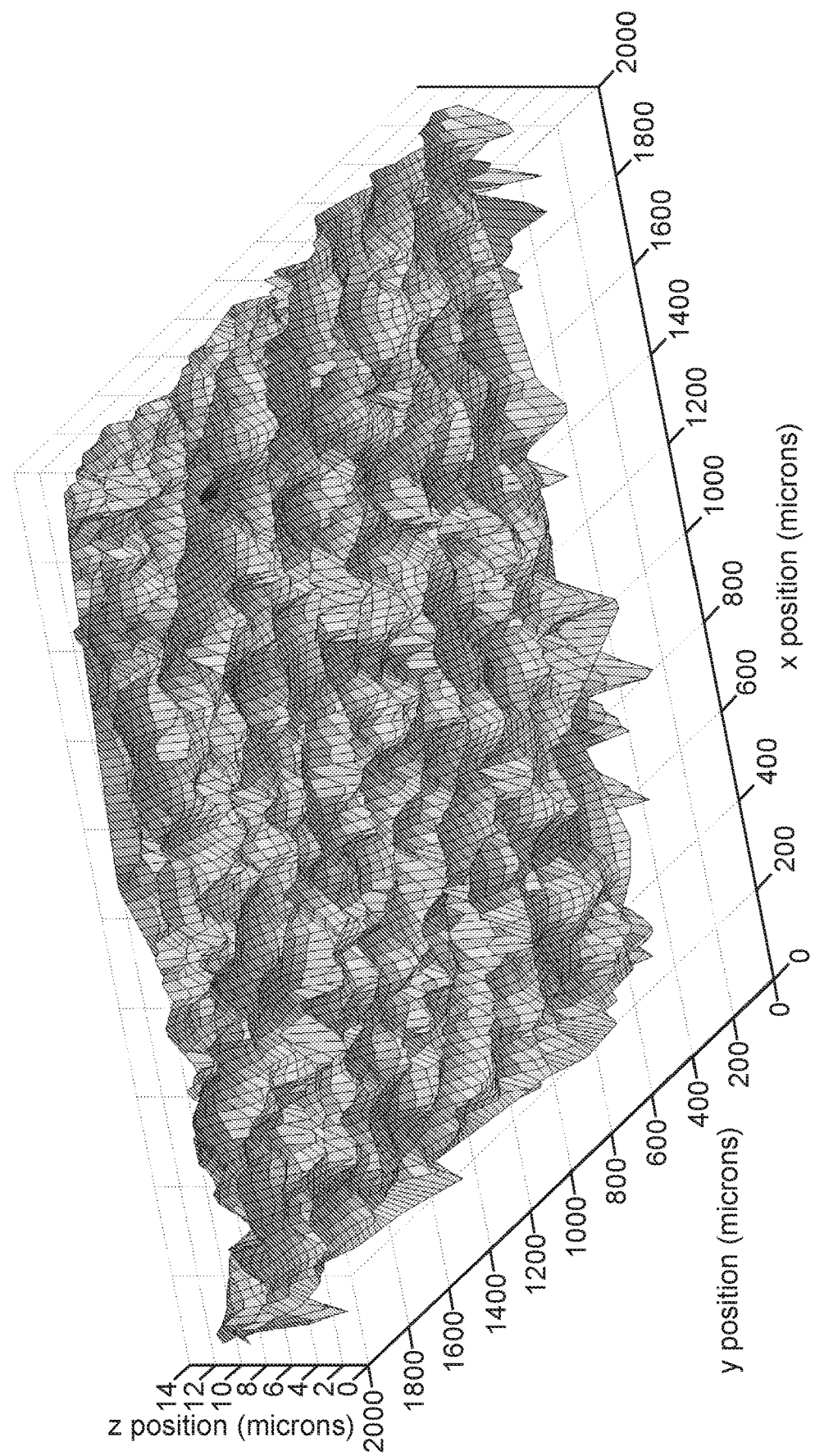
FIG. 8 is an envelope of the top surface defined by the tops of the protrusions of a textured surface.
Figure 9:
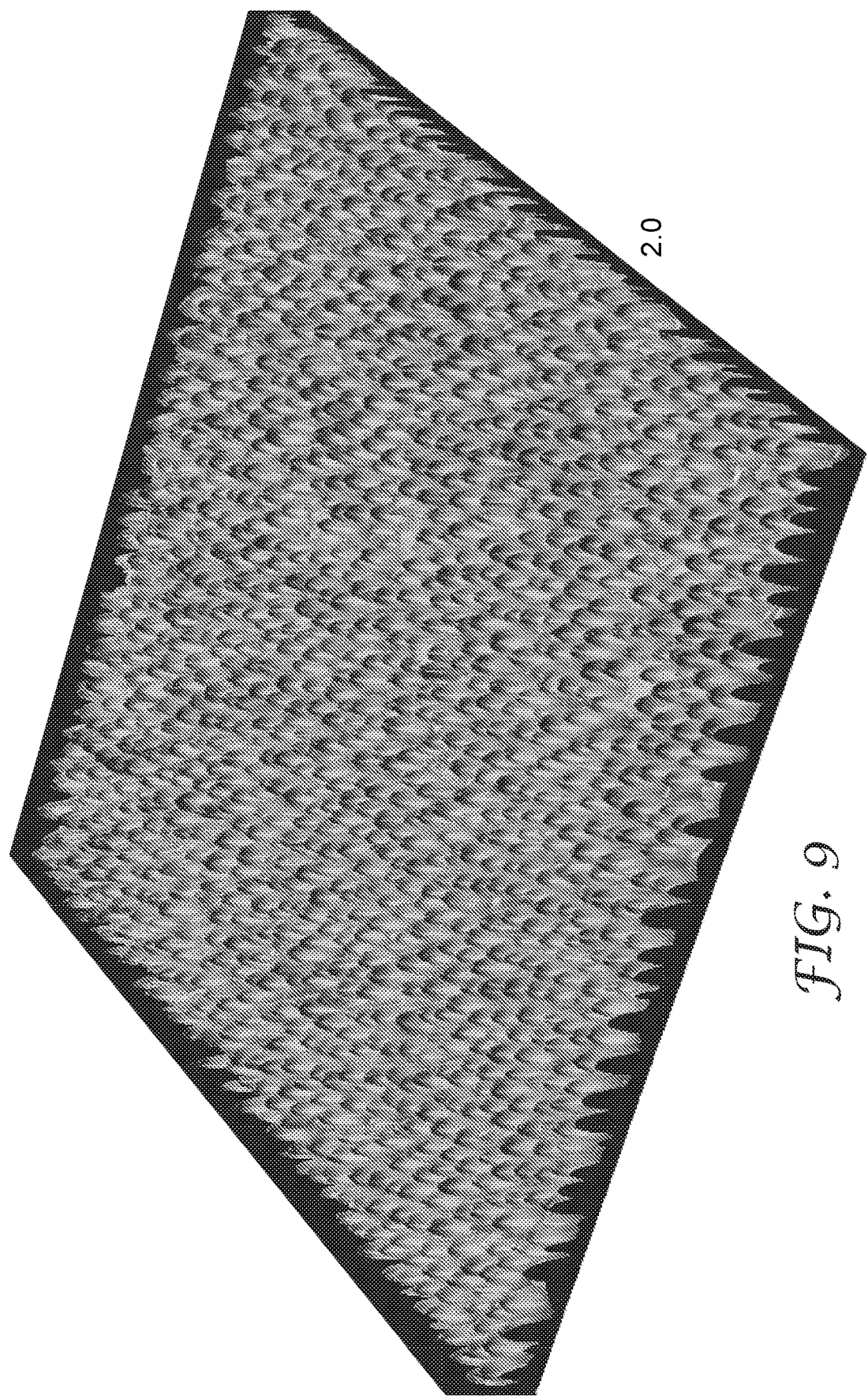
FIG. 9 is a representative topographical map of a textured surface, oblique view, map area=2.0×2.0 millimeter.

For each image feature found in the previous step, the position (in x, y and z) of the highest point was found by performing a search of the topography data within the binary mask shown in FIG. 8. This array of points was used to define the top surface envelope. The top surface envelope was visualized by creating a regular mesh describing the surface from the array of data points, using the MATLAB routine TriScatteredInterp.m. as illustrated in FIG. 8 which corresponds to the textured surface as illustrated in FIG. 9.

4. Analysis of Top Surface Envelope

Conventional roughness parameters were used to analyze the envelope surface as described in Table 2.

TABLE 2

| Parameter | Definition | Notes |
| --- | --- | --- |
| Envelope Rq | $R_q = \sqrt{\frac{\sum_{i=1}^{n}(Z_i - \bar{Z})^2}{n}}$ | The RMS roughness, or the standard deviation of the height values of the surface envelope defined by the tops of the protrusions/beads |
| Envelope Rp | $Rp = \max(Z) - \text{mean}(Z)$ | Maximum Peak Height. The height difference between the mean of the surface defined by the tops of all the protrusions and the top of the highest protrusion in the evaluation region (here a 1 millimeter × 1 millimeter evaluation area). |

5. Analysis of Individual Features

The characteristics of individual features were then determined. First, the radius of curvature of each feature was calculated from the topographic map. The method involved finding the curvature of the feature at its highest point. The curvature was calculated at the highest point on the feature as well as the 8 nearest neighbor pixels. For irregular features, the highest point of the feature was sometimes at the edge of the feature, and so some of the nearest neighbor pixels are not on the feature. To accommodate this, only the pixels located on the feature were included (a binary map similar to that shown in FIG. 10 was used as a mask to determine valid points). The mean of the curvature of all valid pixels at and near the highest point was reported as the curvature, and the reciprocal of the mean local curvature was reported as the radius of curvature for that feature. Negative numbers indicated that the features were curved downwards. The parameters Rt and Sm (defined in Table 3) were computed using x-stylus analyses performed in Vision Software (Veeco Incorporated, Tucson, Ariz.) where every line in the map was analyzed and the mean value was reported. In each case, each line was subdivided into 5 sublengths and analyzed.

TABLE 3

| Parameter | Notes |
| --- | --- |
| Rt | Peak to valley difference calculated over an evaluation length. Each scan line (in the x-direction) in the map is sub-divided into 5 evaluation lengths and the values are averaged for each line and then averaged for all lines. |
| Sm | Mean peak spacing: mean spacing between profile peaks at the mean line, measured over the evaluation length. A profile peak is the highest point on the profile between an upwards and downwards crossing of the profile of the mean line. |

6. Analysis of Feature Spacing

Figure 10:
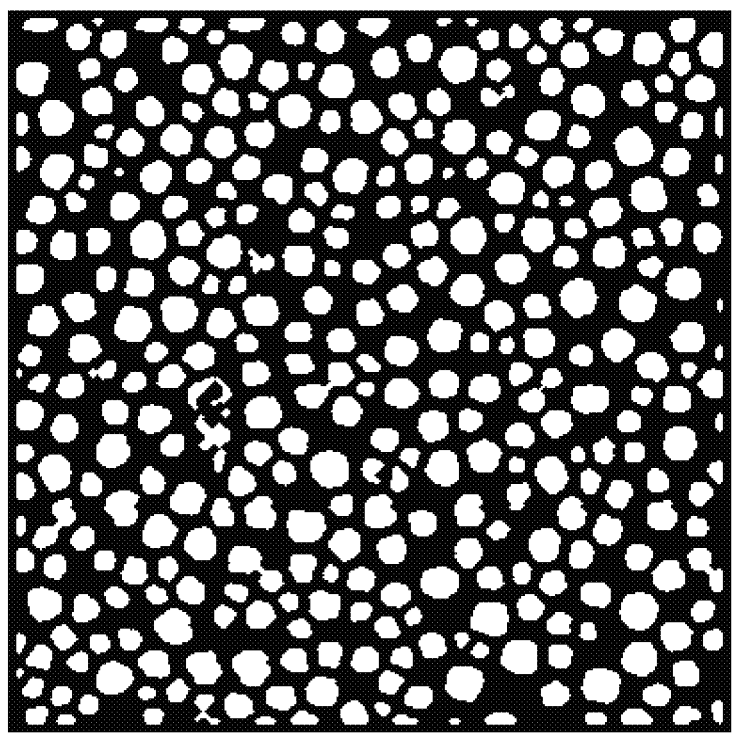
FIG. 10 is a combined map of the two curvature maps in x- and y-directions as shown in FIGS. 6 and 7.

Feature spacing was determined by counting the number of features/square millimeter area as determined in step 5 and shown in FIG. 10.

Method for Making Bead Film Transfer Article

Borosilicate Bead Carrier

Borosilicate glass powder was passed through a flame treater twice by passing it through a hydrogen/oxygen flame at a rate of 3 grams/minute to form microspheres that were collected in a stainless steel container whereupon metallic impurities were removed using a magnet. The resulting glass microspheres were treated with 600 ppm of A1100 in the following manner. The silane was dissolved in water, then added to the microsphere beads with mixing, air dried overnight, followed by drying at 110° C. for 20 minutes. The dried, silane treated microsphere beads were then sieved to remove any agglomerates and provide beads having a size of 75 micrometers or less and were free flowing. The resulting transparent silane treated microspheres were cascade coated using a mechanical sifter onto a transfer carrier comprising a polyethylene coated polyester substrate liner which had been preheated to about 140° C. (284° F.), to form a bead carrier having a uniform layer of transparent microspheres embedded in the polyethylene layer to a depth corresponding to about 30-40% of their diameter as determined by a magnifying imaging system.

Differential Scanning calorimetry

Differential Scanning calorimetry (DSC) was performed using a Q2000 DSC from TA Instruments Incorporated, New Castle, Del. and nitrogen purge gas. A typical experiment involved sealing a 4-20 milligram sample of film or resin in an aluminum, T-zero sample pan and heating the sample at a rate of 5° C./minute (41° F./minute) from −150 to 300° C. (−238 to 572° F.). A plot of heat flow versus temperature was used for the analysis. The $T_m$ or melting point was recorded as the minimum value of the melting transition on the curve. To determine glass transition temperatures (using ASTM E1356-08), the specimens were prepared for thermal analysis by weighing and loading the material into TA Instruments aluminum DSC sample pans. The specimens were analyzed using the TA Instruments Discovery Differential Scanning calorimeter (DSC) utilizing a heat-cool-heat method in modulated mode (±1° C., 60 seconds, between −155 to 160° C. (−247 to 320° F.) at 5° C./minute). After data collection, the thermal transitions were evaluated using the Universal Analysis Software Package. Any glass transitions (Tg), endothermic or exothermic peaks, or significant artifacts were evaluated. Glass transition temperatures were determined using the step change in the heat flow (HF) curve and the midpoint (half height) was noted.

Dynamic Mechanical Analysis (DMA)

The storage modulus (E') for various samples was measured using a dynamic mechanical analyzer (Model Q800 DMA, TA Instruments, New Castle, Del.) in film tension mode with a tensile grip separation distance of between 10.0 millimeters and 2.0 millimeters (0.41 to 0.83 inches), and a temperature ramp rate of 2.5° C./minute. Samples were analyzed with a frequency of 1.0 Hz through a temperature sweep starting at −50° C. (−58° F.) up to 220° C. (428° F.) or until they yielded or broke.

EXAMPLES

Thermoforming of Bead Films

Thermoformable bead films measuring 20.3 centimeters (8 inches) square were thermoformed using a MAAC thermoformer (model 04138 3M, MAAC Machinery Corporation, Carol Stream, Ill.). A male test mold having a 6.35 centimeters (2.50 inches) square base, a height of 1.27 centimeters (0.5 inches), and various radii and draft angles to its vertical sides was used to form the films (see FIG. 4). The sheet temperature just before the mold contacts the film was measured using a non-contact (infrared) thermometer, commercially available under the trade designation "Raytek MI3 Miniature Infrared Sensor" from Raytek. The parameters used for all samples are shown in the table 4 below.

TABLE 4

| Upper Radiant Oven Master Output (%) | Lower Radiant Oven Master Output (%) | Upper Radiant Oven Compensation (%) | Lower Radiant Oven Compensation (%) | Oven Door Position | Vacuum | Oven Return Delay (Seconds) |
| --- | --- | --- | --- | --- | --- | --- |
| 55 | 55 | −35 | −45 | Closed | 30 in. Hg/157 Pa | 5 |

Synthesis Example A

To a 1 gallon clear glass jar were added 961.5 grams (0.702 equivalents) GK-570 and 90.09 grams (0.581 equivalents) MOI. The jar was placed on a mechanical roller for 2 hours, at which time the mixture was clear and homogeneous. One milliliter of the clear homogeneous solution was applied to the IR crystal of a ThermoScientific SMART MULTIBOUNCE HATR and the isocyanate absorption peak at ~2300 cm-1 was observed when the infrared spectrum was measured. To the mixture was added 0.66 grams T12 and the gallon jar was placed on the mechanical roller for 70 hours, at which time IR analysis showed the disappearance of the isocyanate absorption peak. To this solution were added 3.7 grams IRGACURE 651 and 43.6 grams ethyl acetate, and the contents were mixed by placing the gallon glass jar on the mechanical roller for 24 hours. The resulting solution contained 66 wt % solids.

Example 1

A solvent based two-part fluorourethane was prepared as follows. 0.71 grams D100 (0.0022 equivalents), 25.57 grams GK-570 (0.0187 equivalents), 16 microliters T12, 5.13 grams ethyl acetate, and 0.09 grams IRGACURE 651 were mixed using a centrifugal resin mixer (MAX 40 mixing cup and FlackTek Speedmixer DAC 150 FV; both from FlackTek Incorporated, Landrum, S.C.) at 2500 rpm for 30 seconds. The resulting solution was applied to a 30.5 centimeters (12 inches) wide borosilicate bead carrier, prepared as described above, using a notchbar coater with a gap setting that was 0.15 millimeters (0.006 inch) greater than the thickness of the bead carrier at a rate of about 1.52 meters/minute (5 feet/minute). The binder resin coated bead carrier was air dried for an hour and then dried for an hour at 80° C. (176° F.) in a forced air oven. The approximate ratio of equivalents isocyanate to equivalents hydroxyl was 0.118:1.0.

Next, a 100% solids, two-part polyurethane mixture was prepared by combining and mixing the following components in a cup using a centrifugal resin mixer (MAX 40 mixing cup and FlackTek Speedmixer DAC 150 FV; both from FlackTek Incorporated, Landrum, S.C.) at 2500 rpm for 30 seconds: 14.26 grams DES W, 0.75 grams N3300A, 15.03 grams TERATHANE 650, 2.86 grams 1,4 BUTANE-DIOL and 25 microliters T12. The approximate ratio of equivalents isocyanate to equivalents hydroxyl was 1.025:1. This mixture was then coated between a 0.178 millimeter (0.007 inch) thick, plasma treated PCPBT substrate and the exposed surface of the binder resin (first) coating using a notch bar coater with a gap setting of 63.5 micrometers (0.0025 inches) greater than the combined thickness of the film and the bead carrier.

The resulting twice coated, bead film was cured in five stages as follows: 60 minutes at 40° C. (104° F.); 60 minutes at 50° C. (122° F.); 60 minutes at 60° C. (140° F.); 60 minutes at 70° C. (158° F.); and finally for 60 minutes at 80° C. (176° F.) to provide a transfer article having borosilicate beads which were partially embedded in polyethylene on one side and in the fluorourethane binder resin layer on the other side, and a coating of polyurethane resin between the fluorourethane binder resin layer and the PCPBT substrate.

After removal of the transfer carrier, a 0.5 millimeter (0.02 inches) thick, bead film construction having borosilicate beads partially embedded on one side of a binder resin layer, wherein the binder resin layer comprises a fluorourethane with pendent methacrylate groups, wherein the binder resin layer is disposed on a layer comprising a 100% solids-based, two part polyurethane resin, which is disposed on a PCPBT substrate.

The bead film construction with PCPBT substrate from above was taped to a 6.35 millimeter (0.25 inch) thick steel plate, which was placed in a ventilated hood so that the film was near vertical. 3M PAINT DEFENDER was applied to the embedded borosilicate bead surface of the bead film construction at a speed of 0.61 seconds/meter (2 seconds/foot) in a horizontal motion starting at the top of the sample. At the end of each pass the spray was continued at the same speed aiming roughly 2.5 centimeters (1 inch) lower than the previous pass. In this way the entire sample was coated in a horizontal pattern. The process was repeated but with a vertical spraying pattern and then repeated again with the horizontal spray pattern. In this way the sample was effectively spray covered 3 times. The sample was air dried for an hour and then oven dried for an hour at 50° C. (122° F.).

This process yielded a 0.7 millimeter (0.028 inch) thick, bead film with a stabilizing layer covering the beaded surface.

Example 1 was then Thermoformed as Described Above in Thermoforming Bead Film

Comparative Example 1

Comparative Example 1 was prepared as described for Example 1 with the following modification: no 3M PAINT DEFENDER stabilizing layer was utilized. Comparative Example 1 was thermoformed as described above in Thermoforming Bead Film.

Example 2

A solvent based two-part fluorourethane was prepared as follows. 28.46 grams D100 (0.0867 equivalents) dissolved in 190.4 grams ethyl acetate was added to Synthesis Example A (0.702 equivalents GK 570 reacted with 0.581 equivalents MOI) and mixed with a paint stick for 10 minutes, at which time the solution was clear and homogeneous. The resulting solution was applied to a 30.5 centimeters (12 inches) wide borosilicate bead carrier, prepared as described above, using a notchbar coater with a gap setting of 0.076 millimeters (0.003 inch) greater than the thickness of the bead carrier at a rate of about 1.5 meters/minute (5 feet/minute). The binder resin coated bead carrier was dried in three ovens each having a length of 3 meters (10 feet) at 90° C. (194° F.), 100° C. (212° F.), and 110° C. (230° F.) respectively. The ratio of isocyanate equivalents between the MOI (from Synthesis A) and D100 was 87:13/MOI:D100. The approximate ratio of equivalents isocyanate to equivalents hydroxyl was 0.95:1.0. The surface of the fluorourethane was corona treated under nitrogen with total energy of 500 milliJoules/square centimeter prior to application of the two-part urethane overcoat.

Next, a 100% solids, two-part polyurethane mixture was prepared by combining and mixing the following components in a cup using a centrifugal resin mixer (MAX 40 mixing cup and FlackTek Speedmixer DAC 150 FV; both from FlackTek Incorporated, Landrum, S.C.) at 2500 rpm for 30 seconds: 14.25 grams DES W, 0.75 grams N3300A, 15.04 grams TERATHANE 650, 2.86 grams 1,4 BUTANEDIOL and 25 microliters T12. The approximate ratio of equivalents isocyanate to equivalents hydroxyl was 1.025:1. This mixture was then coated between a 0.178 millimeters (0.007 inch) plasma treated PCPBT substrate and the non-beaded surface of the binder resin coating using a notch bar coater with a gap setting of 0.0635 millimeters (0.0025 inch) greater than the combined thickness of the substrate and the once coated bead carrier.

The resulting twice coated, bead film was cured in five stages as follows: 60 minutes at 40° C. (104° F.); 60 minutes at 50° C. (122° F.); 60 minutes at 60° C. (140° F.); 60 minutes at 70° C. (158° F.); and finally for 60 minutes at 80° C. (176° F.) to provide a transfer article containing borosilicate beads which were partially embedded in polyethylene on one side and in the fluorourethane binder resin layer on the other, and a coating of polyurethane resin between the fluorourethane binder resin layer and the PCPBT substrate.

After removal of the transfer carrier, a 0.35 millimeter (0.014 inch) thick, bead film construction having borosilicate beads partially embedded on one side of a fluorourethane binder resin layer, wherein the fluorourethane binder resin layer is disposed on a layer comprising a 100% solids-based, two part polyurethane resin, which is disposed on a PCPBT substrate.

Example 2 was taped to a 6.35 millimeter (0.25 inch) thick steel plate, which was placed in a ventilated hood so that the film was near vertical. 3M PAINT DEFENDER was applied to the embedded borosilicate bead surface of the bead film at a speed of 0.61 seconds/meter (2 seconds/foot) in a horizontal motion starting at the top of the sample. At the end of each pass the spray was continued at the same speed aiming roughly 2.5 centimeters (1 inch) lower than the previous pass. In this way the entire sample was coated in a horizontal pattern. The process was repeated but with a vertical spraying pattern and then repeated again with the horizontal spray pattern. In this way the sample was effectively spray covered 3 times. The sample was air dried for an hour and then oven dried for an hour at 50° C. (122° F.). This process yielded a 0.4 millimeters (0.016 inch) thick, bead film with a stabilizing layer.

Example 2 was then Thermoformed as Described Above in Thermoforming Bead Film

Example 3

Example 3 was prepared as described for Example 2 with the following modification: the embedded borosilicate bead surface of the free standing bead film was coated with a liquid two part silicone (instead of the 3M PAINT DEFENDER of Example 2) as follows: the beaded film was knife-coated on the beaded side of the film with SYLGARD 184 at gap setting of 0.127 millimeters (0.005 inch) greater than the thickness of the film and bead carrier, cured overnight at room temperature and then 45 minutes at 100° C. (212° F.) to yield a 0.5 millimeter (0.02 inch) bead film with a stabilizing layer.

Example 3 was then Thermoformed as Described Above in Thermoforming Bead Film

Comparative Example 2

Comparative Example 2 was prepared as described for Example 2 with the following modification: no stabilizing layer was utilized. Comparative Example 2 was thermoformed as described above in Thermoforming Bead Film.

Example 4

Part A—An 18% solids (w/w) solution of FX5912 in MIBK was applied onto a 35.56 centimeters (14 inches) wide borosilicate bead carrier, using a coating line with a 25.4 centimeter (10 inch) wide coating head and three drying ovens each set at 90° C., at a rate of 152 centimeters/minute (5 feet/minute). The total drying time was 6 minutes. The gap setting on the coating head was set to yield a dry coating weight of 13.13 grams per square meter of the borosilicate bead carrier. After drying, samples of the fluoropolymer coated borosilicate bead carrier were plasma treated on their exposed fluoropolymer surface at 2000 Watts under a vacuum of 90 milliTorr, and a nitrogen flow rate of 1000 standard cubic centimeters per minute at 3 meters/minute (10 feet/minute), using a homebuilt plasma treatment system described in detail in U.S. Pat. No. 5,888,594 (David et al.) with the following modifications: the width of the drum electrode was increased to 108 centimeters (42.5 inches) and the separation between the two compartments within the plasma system was removed so that all the pumping was carried out by means of the turbo-molecular pump. In this manner, a plasma treated, fluoropolymer coated, borosilicate bead carrier was provided.

Part B—A solvent based two-part polyurethane mixture was prepared by mixing the following components: 145.84 grams XP2617, 22.16 grams 1,4 BUTANEDIOL, 126 microliters T12 catalyst and 112 grams ethyl acetate in a 0.946 liter (1 quart) jar. The mixture was swirled for 8 minutes at which time the solution was clear and homogeneous. This resulting mixture was then coated between a 0.127 millimeter (0.005 inch) thick PC substrate and the final film of Part A using a laboratory notch bar coater having a gap setting of about 100 micrometers (0.004 inches) greater than the combined thickness of the two films. The coating was pulled slowly, at approximately 17.8 centimeter/minute (7 inches/minute), to avoid producing bubbles. The coatings were then taped to a metal tray and stored at room temperature (25° C. (77° F.)) for one hour. Next, the films were cured in an oven for 5 hours starting at 40° C. (104° F.) and increasing in increments of 10° C. (50° F.)/hour after which the oven was turned off and the samples allowed to cool to room temperature. The transfer carrier was then removed to reveal a beaded film with thickness of approximately 0.32 millimeters (0.013 inches) comprising borosilicate beads partially embedded on one side of a fluoropolymer binder resin layer, wherein the fluoropolymer binder resin layer is disposed on a layer comprising a two part polyurethane resin, which is disposed on a PC substrate.

Part C—The beaded film of Part B was knife-coated on the embedded borosilicate bead side of the film with SYLGARD 184 at gap setting of 0.127 millimeters (0.005 inch) greater than the thickness of the film of Part B, cured overnight at room temperature and then placed in a forced air oven for 45 minutes at 100° C. (212° F.) to yield a 0.48 millimeter (0.019 inch) film with a stabilizing layer. Example 4 was then thermoformed as described above in Thermoforming Bead Film.

Comparative Example 3

Part A was made in the same manner as described in Example 4.

Part B—A 100% solids, two-part polyurethane mixture was prepared by combining and mixing the following components in a cup using a centrifugal resin mixer (MAX 40 mixing cup and FlackTek Speedmixer DAC 150 FV; both from FlackTek Incorporated, Landrum, S.C.) at 2500 rpm for 30 seconds: 14.25 grams DES W, 0.75 grams N3300A, 15.04 grams TERATHANE 650, 2.86 grams 1,4 BUTANEDIOL and 25 microliters T12. The approximate ratio of equivalents isocyanate to equivalents hydroxyl was 1.025:1. This mixture was then coated between a 0.007 inch (178 micrometers) plasma treated PCPBT substrate and the plasma treated, fluoropolymer coated, borosilicate bead carrier using a notch bar coater with a gap setting of 0.0635 millimeters (0.0025 inches) greater than the combined thickness of the substrate and the once coated beaded film transfer article. The transfer carrier was removed to yield a beaded film with a thickness of 0.5 millimeters (0.02 inches).

Part C—the beaded film from above was taped to a 6.35 millimeter (0.25 inch) thick steel plate, which was placed in a ventilated hood so that the film was near vertical. 3M PAINT DEFENDER was applied to the embedded borosilicate bead surface of the bead film at a speed of 0.61 seconds/meter (2 seconds/foot) in a horizontal motion starting at the top of the sample. At the end of each pass the spray was continued at the same speed aiming roughly 2.5 centimeters (1 inch) lower than the previous pass. In this way the entire sample was coated in a horizontal pattern. The process was repeated but with a vertical spraying pattern and then repeated again with the horizontal spray pattern. In this was the sample was effectively spray covered 3 times. The sample was air dried for an hour and then oven dried for an hour at 50° C. (122° F.) to yield a 0.6 millimeter (0.024 inch) bead film with a stabilizing layer. Comparative Example 3 was then thermoformed as described above in Thermoforming Bead Film.

Comparative Example 4

Part A—An 18% solids (w/w) solution of FX5912 in MIBK was applied onto a 35.56 centimeters (14 inches) wide borosilicate bead carrier, using a coating line with a 25.4 centimeters (10 inch) wide coating head and three drying ovens each set at 90° C. (194° F.), at a rate of 152 centimeters/minute (5 feet/minute). The total drying time was 6 minutes. The gap setting on the coating head was set to yield a dry coating weight of 13.13 grams per square meter of the borosilicate bead carrier. After drying, samples of the fluoropolymer coated borosilicate bead carrier were plasma treated on their exposed fluoropolymer surface as described in Example 4.

Part B—A solvent based two-part polyurethane mixture was prepared by mixing the following components: 145.84 grams XP2617, 22.16 grams 1,4 BUTANEDIOL, 126 microliters T12 catalyst and 112 grams ethyl acetate in a 0.946 liter (1 quart) jar. The mixture was swirled for 8 minutes at which time the solution was clear and homogeneous. This resulting mixture was then coated between a 125 micrometers (0.005 inch) thick PCPBT substrate and the final film of Part A using a laboratory notch bar coater having a gap setting of about 100 micrometers (0.004 inches) greater than the combined thickness of the two films. The coating was pulled slowly, at approximately 7 inches/minute (17.8 centimeter/minute), to avoid producing bubbles. The coatings were then taped to a metal tray and stored at room temperature (25° C. (77° F.) for one hour. Next, the films were cured in an oven for 5 hours starting at 40° C. (104° F.) and increasing in increments of 10° C. (50° F.)/hour after which the oven was turned off and the samples allowed to cool to room temperature. The transfer carrier was then removed to reveal a beaded film with thickness of approximately 0.32 millimeters (0.013 inches).

Part C—3M VINYL TAPE 471+ was applied in strips to the top, embedded borosilicate bead side of the bead film from above to yield a 0.48 millimeter (0.019 inch) bead film with a tape layer.

Then, the film was thermoformed as described above. The tape was removed before profilometry analysis was conducted.

Comparative Example 5

Part A was made in the same was as described in Example 4.

Part B—A 100% solids, two-part polyurethane mixture was prepared by combining and mixing the following components in a cup using a centrifugal resin mixer (MAX 40 mixing cup and FlackTek Speedmixer DAC 150 FV; both from FlackTek Incorporated, Landrum, S.C.) at 2600 rpm for 30 seconds: 30.97 grams XP2617; 4.03 grams 1,4 BUTANEDIOL; 31.5 microliters T12 catalyst (the raw materials were de-gassed prior to use). The cup was placed in the chamber and a vacuum was pulled for 10-15 seconds. This mixture was then coated between a 0.127 mm (0.005 inch) thick PCPBT substrate and the final film of Part A using a laboratory notch bar coater having a gap setting of about 100 micrometers (0.004 inches) greater than the combined thickness of the two films. The coating was pulled slowly, at approximately 17.8 centimeters/minute (7 inches/minute), to avoid producing bubbles. The coatings were then taped to a metal tray and stored at room temperature (25° C. (77° F.)) for one hour. Next, the films were cured in a forced air oven for 5 hours starting at 40° C. (104° F.) and increasing in increments of 10° C. (50° F.)/hour after which the oven was turned off to bring the films back to room temperature. The transfer carrier was then removed to reveal a beaded film with thickness of approximately 0.32 millimeters (0.013 inches). No Part C was applied to this beaded film.

Comparative Example 5 was then thermoformed as described above in Thermoforming Bead Film.

Example 5

Part A—A polyol solution was prepared by adding 2323.86 grams 1,4-BUTANEDIOL, 100.32 grams TINUVIN 405, 10.03 grams T12 and 4170.50 grams MEK to a 5 gallon pail and mixing with an air-powered propeller stirrer. An isocyanate solution was prepared by adding 13628.75 grams XP2617 and 1514.31 grams MEK to a 5 gallon pail and then mixing with an air-powered propeller stirrer.

The polyol solution and the isocyanate solution were fed into a static mixer to provide an output dried coating weight of 69.3 grams/square meter onto PC at a width of 43 centimeters (17 inches) using a knife coater having a gap setting of about 127 micrometers (0.005 inches) greater than the thickness of the PC. The coating was carried out at a speed of 7.62 meters/minute (25 feet/minute) and dried and cured in line with five ovens set at 66° C. (150° F.), 66° C. (150° F.), 71° C. (160° F.), 82° C. (180° F.), and 96° C. (205° F.), respectively. That coating was then processed through a lamination step where borosilicate bead carrier was adhered to the coated urethane via a pressure nip with a heated roll (102° C. (215° F.)) and applying a pressure of 0.55 MPa. The approximate ratio of equivalents isocyanate to equivalents hydroxyl was 1.05:1.0. A bead film of two part polyurethane resin with partially embedded borosilicate microsphere beads on one side and polycarbonate film on the other side was obtained by removal of the transfer carrier. The total thickness of the beaded film was measured and found to be approximately 225 micrometers.

Part B—30.0 grams SYLGARD 184 part A was added to a MAX 60 Speedmixer cup (FlackTek Incorporated, Landrum, S.C.) followed by 3.01 grams SYLGARD 184 Part B. The mixture was mixed at 2900 rpm for 60 seconds in a DAC 150.1 FVZ-K Speedmixer (FlackTek Incorporated, Landrum, S.C.). The two-part silicone was coated onto the exposed beaded surface of the film of Part B using a notchbar coater, having a gap setting of 250 micrometers (0.010 inches) greater than the thickness of the film from Part B. The coated film was cured in an oven at 100° C. (212° F.) for 1 hour to yield a 0.6 millimeter (0.024 inch) bead film with a stabilizing layer.

This film was then thermoformed as described above in Thermoforming Bead Film.

Comparative Example 6

Comparative Example 6 was prepared and thermoformed as described for Example 5 with the following modification: no stabilizing layer was applied.

Comparative Example 7

Part A—A homogeneous 85:15 (w:w) polyol mixture of C590:MPD was prepared and then diluted to 80% solids in ethyl acetate. To 5294 grams of this solution was added 11.4 grams T12. A homogeneous 95:5 (w:w) mixture of DES W:N3300A was prepared with gentle stirring. The polyol solution and the isocyanate solution were fed into a static mixer at 25 grams/minute and 16.2 grams/minute respectively to provide an output rate of 41.2 grams/minute onto the borosilicate bead carrier at a width of 33 centimeters (13 inches) using a knife coater having a gap setting of about 51 micrometers (0.002 inches) greater than the thickness of the beaded film transfer article. The coating was carried out at a speed of 1.52 meters/minute (5 feet/minute) and dried and cured in line in three ovens set at 80° C. (176° F.), 90° C. (194° F.), and 90° C. (194° F.) respectively to give a binder resin (once) coated, beaded film transfer article. A dried coating weight of 71.90 grams per square meter of the borosilicate bead carrier was thus provided. The approximate ratio of equivalents isocyanate to equivalents hydroxyl was 1.05:1.0.

Part B—A 100% solids two-part polyurethane was prepared by adding the following vacuum degassed materials to a MAX 60 Speedmixer cup (FlackTek Inc, Landrum, S.C.): 15.00 grams of a 95:5 (w:w) blend of DES W with N3300A and 17.90 grams of a 84:16 (w/w) blend of TERATHANE 650 with 1,4 BUTANEDIOL. Vacuum was applied directly to the cup for 15 seconds and then mixed at 2600 rpm for 30 seconds under full vacuum in a DAC 150.1 FVZ-K Speedmixer (FlackTek Inc, Landrum, S.C.). The mixture was then removed from the Speedmixer and 29.6 microliters T12 was added using a micropipette. The cup was placed under vacuum for 15 seconds and mixed for an additional 30 seconds at 2600 rpm under full vacuum. The resulting mixture was applied between 175 micrometers (0.007 inches) thick PCPBT film and the final film of Part A, both measuring 30.5 centimeters (12 inches) wide, using a notchbar coater having a gap setting of 0.0635 millimeters (0.0025 inches) greater than the combined thickness of the two films at a rate of about 3.0 meters/minute (10 feet/minute). The coated precursor was cured at room temperature for 2 hours then in five stages as follows: 60 minutes at 40° C. (104° F.); 60 minutes at 50° C. (122° F.); 60 minutes at 60° C. (140° F.); 60 minutes at 70° C. (158° F.); and finally for 60 minutes at 80° C. (176° F.). The resulting transfer article was found to be 0.50 mm thick and was then thermoformed with the transfer carrier still in place.

Comparative Example 8

Comparative Example 8 was prepared as described for Comparative Example 6 and the film was thermoformed. However, the section of the part that was used for the surface profilometry measurements was not on the side of the box shape, but rather on the flat part of the film.

Example 9

Example 9 was prepared as described for Example 5 with the following modification: the section of the part that was used for the surface profilometry measurements was not on the side of the box shape, but rather on the flat part of the film.

Comparative Example 10

Comparative Example 10 was prepared as described for Comparative Example 6 with the following modification: the film was not thermoformed.

The resulting bead films from the Examples and Comparative Examples were then tested as described above for their Surface profilometry measurements. Shown in Table 5 below is the process temperature (T1) used for thermoforming, the Tg of the stabilizing layer, the Tg of the binder resin layer, whether or not the stabilizing layer was cleanly removed from the bead film after thermoforming, and the profilometry results.

zontal motion starting at the top of the sample. At the end of each pass the spray was continued at the same speed aiming roughly 2.5 centimeters (1 inch) lower than the previous pass. In this way the entire sample was coated in a horizontal pattern. The process was repeated but with a vertical spraying pattern and then repeated again with the horizontal spray pattern. The samples was air dried for 6 minutes and the process was repeated. In this way the sample was effectively spray covered 7 times. The sample was air dried for an hour and then oven dried for an hour at 50° C. (122° F.). This process yielded a 0.175 millimeter (0.007 inch) thick, free-standing bead film.

Polyethylene

Polyethylene pellets were melted in an oven at 140° C. for 30 minutes in an aluminum tin. The tin was removed from the oven and the polyethylene removed from the tin as a free standing film 1.89 millimeters (0.075 inches) thick.

TABLE 5

| Ex No. | T1 (° F./° C.) | Stabilizing Layer $T_g$ (° C.) | Binder Resin Layer $T_g$ (° C.) | Stabilizing Layer cleanly removed | $R_q$ (μm) | $R_p$ (μm) | $R_t$ | $S_m$ |
|---|---|---|---|---|---|---|---|---|
| 1 | 320/160 | −51 to −53 68 to 69 | 26.6 | yes | 2.30 | 5.63 | 30.0 | 66.2 |
| CE1 | 323/162 | n/a | 26.6 | n/a | 2.66 | 6.75 | 30.8 | 70.8 |
| 2 | 324/162 | −51 to −53 68 to 69 | 18.9 | yes | 2.66 | 7.46 | 28.9 | 71.6 |
| 3 | 333/167 | −123 to −125 | 18.9 | yes | 2.73 | 6.30 | 29.4 | 72.8 |
| CE2 | 324/162 | n/a | 18.9 | n/a | 3.42 | 8.39 | 33.2 | 71.5 |
| 4 | 327/164 | −123 to −125 | 10 | yes | 1.80 | 4.87 | 39.0 | 72.3 |
| CE3 | 323/162 | −51 to −53 68 to 69 | 10 | no* | 3.25 | 7.17 | 34.1 | 74.7 |
| CE4 | 315/157 | −51 to −44 13-27 | 10 | yes | 2.98 | 7.61 | 28.0 | 68.0 |
| CE5 | 339/171 | n/a | 10 | n/a | 5.01 | 13.4 | 36.3 | 66.7 |
| 5 | 400/204 | −123 to −125 | 25 | yes | 2.98 | 6.53 | 30.3 | 74.1 |
| CE6 | 398/203 | n/a | 25 | n/a | 4.83 | 12.0 | 24.9 | 76.6 |
| CE7 | 346/174 | −125 67 to 81 | 25 | no | n/a | n/a | n/a | n/a |
| CE8 | 397/203 | −125 67 to 81 | 25 | n/a | 4.27 | 10.8 | 21.0 | 71.8 |
| 9 | 400/204 | −125 67 to 81 | 25 | yes | 2.38 | 5.36 | 28.7 | 73.8 |
| CE10 | n/a | n/a | 25 | n/a | 1.75 | 3.98 | 20.1 | 57.4 | n/a = not applicable
*Although the stabilizing layer was easily removed from the bead film, microspheres remained adhered to the stabilizing layer.

As shown in Table 5 above, thermoformed examples utilizing a stabilizing layer had lower envelope $R_q$ and envelope $R_p$ values than the corresponding comparative examples not using a stabilizing layer.

DMA Preparation and Results
Preparation of Samples for DMA
SYLGARD 184

20.01 grams SYLGARD 184 part A was added to a MAX 40 Speedmixer cup (FlackTek Incorporated, Landrum, S.C.) followed by 2.02 grams SYLGARD 184 Part B. The mixture was mixed at 2700 rpm for 45 seconds in a DAC 150.1 FVZ-K Speedmixer (FlackTek Incorporated, Landrum, S.C.). The two-part silicone was coated onto a polyethylene coated polyester film using a notchbar coater, having a gap setting of 275 micrometers (0.011 inches) greater than the thickness of the film from Part B. The coated film was cured in an oven at 100° C. (212° F.) for 1 hour. The resultant film thickness was 0.350 millimeters (0.014 inches).

3M Paint Defender

3M PAINT DEFENDER was applied to the surface of a 12 inch by 12 inch piece of polyethylene coated polyester at a speed of 0.61 seconds/meter (2 seconds/foot) in a hori- Binder Resin A The two-part fluorourethane binder resin used in Example 1 was made into a flat film by coating the two-part fluorourethane solution from Example 1 onto a polyethylene coated polyester liner using a notchbar coater with a gap setting that was 0.375 millimeters (0.015 inch). The sample was air dried for 10 minutes and then dried for 1 hour at 80 C, at which time the free standing film was removed from the liner and the measured free film thickness was 0.13 millimeters (0.0052 inches).

Binder Resin B

The two-part fluorourethane binder resin used in Example 2 was made into a flat film by coating the two-part fluorourethane solution from Example 2 onto a polyethylene coated polyester liner using a notchbar coater with a gap setting that was 0.375 millimeters (0.015 inch). The sample was air dried for 10 minutes and then dried for 12 hour at 80 C, at which time the free standing film was removed from the liner and the measured free film thickness was 0.14 millimeters (0.0056 inches).

Binder Resin C

A 100% solids, two part polyurethane was made by adding the following vacuum degassed raw materials to a MAX 40 Speedmixer cup (FlackTek Inc, Landrum, S.C.) in this order: 24.00 g Desmodur XP2617, and 2.77 g 1,4-butanediol. Vacuum was applied directly to the cup for 15 seconds and then mixed at 2500 rpm for 30 seconds under full vacuum in a DAC 150.1 FVZ-K Speedmixer (FlackTek Inc, Landrum, S.C.). The sample was removed from the Speedmixer, 9 microliters DABCO T12 was added using a micropipette then the cup was again placed under vacuum for 15 seconds and mixed for an additional 30 seconds at 2500 rpm under full vacuum. The resulting mixture was applied to a 30.5 cm (12 inches) wide notch bar coater between silicone-coated polyester film release liners with a gap of 0.305 mm (0.012 inches) greater than the combined thickness of the liners at a rate of about 3.0 meters/minute (10 feet/minute). The resulting release liner covered, urethane film was cured at 110° C. (230° F.) for 6 minutes then immediately annealed in a 100° C. (212° F.) for 24 hours followed by immediate transfer to a lab freezer until testing was executed. A 0.25 mm (0.0098 inches) thick, urethane film of 100% solids-based, two part polyurethane resin was obtained by removal of both silicone-coated polyester film release liners.

Binder Resin D

The two-part polyurethane was prepared as described in Comparative Example 7 above, was made into a flat film by coating the solution between two polyethylene coated polyester film release liners using a notchbar coater having a gap setting of 0.25 millimeters (0.010 inches) greater than the combined thickness of the liners. The sample was cured at room temperature for 2 hours then in five stages as follows: 60 minutes at 40° C. (104° F.); 60 minutes at 50° C. (122° F.); 60 minutes at 60° C. (140° F.); 60 minutes at 70° C. (158° F.); and finally for 60 minutes at 80° C. (176° F.). The liners were removed to provide a film that was 0.27 millimeters (0.011 inches) thick.

Binder Resin E

An 18% solids (w/w) solution of FX5912 in MIBK was applied onto a polyethylene coated polyester using a notchbar coater with a gap setting that was 1.25 millimeters (0.050 inch). The samples was dried for 1 hr at 90 C. After drying, the sample remained on the liner for 4 days and was then was removed from the liner and measured and found to be 0.07 mm (0.0028 inches) thick.

The DMA samples described above where then tested following the DMA test method described above. The storage modulus (E') at 120° C., 150° C., and 200° C. for the samples are shown in Table 6. ND used in Table 6 means that the samples softened to an extent that the instrument was unable to take a measurement.

TABLE 6

| Sample | E' at various temperatures (MPa) | | |
|---|---|---|---|
| | at 120° C. | at 150° C. | at 200° C. |
| SYLGARD 184 | 1.66 | 2.06 | 3.65 |
| 3M PAINT DEFENDER | 8.61 | 2.33 | ND |
| Polyethylene | 2.10 | ND | ND |
| Binder resin A | 0.09 | ND | ND |
| Binder Resin B | ND | ND | ND |
| Binder Resin C | 0.9 | 0.6 | ND |
| Binder Resin D | 1.85 | 0.98 | ND |
| Binder Resin E | 2.1 | ND | ND |

Foreseeable modifications and alterations of this invention will be apparent to those skilled in the art without departing from the scope and spirit of this invention. This invention should not be restricted to the embodiments that are set forth in this application for illustrative purposes. To the extent that there is a conflict or discrepancy between this specification and the disclosure in any document incorporated by reference herein, this specification will control.

What is claimed is:

1. An article comprising:
(i) a bead film comprising a binder resin layer and a plurality of microspheres partially embedded to at least 60% of the microsphere diameter in the binder resin layer wherein a portion of the microspheres outwardly protrude a first distance from the surface of the binder resin layer;
(ii) a stabilizing layer disposed on the outwardly protruding microspheres opposite the binder resin layer, wherein the stabilizing layer intimately conforms to the protruding microspheres, and wherein the stabilizing layer has a glass transition temperature less than 100° C. and a storage modulus at 150° C. of at least 1.5 MPa wherein the stabilizing layer has a thickness greater than the first distance; and
(iii) a release agent, wherein (a) the binder resin layer comprises the release agent, (b) the stabilizing layer comprises the release agent, and/or (c) an intermediate layer comprises the release agent, wherein the intermediate layer is disposed between the plurality of microspheres and the stabilizing layer,
with the proviso that when a polymeric backbone of the binder resin layer has a fluorine content greater than 65 wt %, the stabilizing layer comprises a release agent selected from a silicone, a fluoropolymer, and combinations thereof, and wherein the article is not retroreflective.

2. The article of claim 1, wherein the stabilizing layer comprises at least one of a silicone, a fluoropolymer, and a urethane.

3. The article of claim 1, wherein the stabilizing layer has a thickness at least 1.1 times the first distance.

4. The article of claim 1, wherein the article comprises the intermediate layer and the intermediate layer has a thickness less than ½ of the first distance.

5. The article of claim 1, wherein the release agent comprises at least one of: silicone, and fluoropolymer.

6. The article of claim 1, wherein the binder resin layer comprises at least one of (i) a resin comprising a fluorine-containing polymer, (ii) a linear resin, (iii) a resin having low crosslink densities, and (iv) combinations and blends thereof.

7. The article of claim 6, wherein the fluorine-containing polymer is selected from at least one of the following: fluoroolefins, fluorourethanes, and combinations thereof.

8. The article of claim 6, wherein the fluorine-containing polymer is derived from aqueous dispersions selected from at least one partially fluorinated monomer, at least one non-fluorinated monomer, and combinations thereof.

9. The article of claim 6, wherein the fluorine-containing polymer is a copolymer derived from tetrafluoroethylene, hexafluoropropylene, and vinylidene fluoride.

10. The article of claim 6, wherein the resin having low cross link densities are those resins comprising lightly crosslinked material having a molecular weight per crosslink point of greater than about 2,800 g/mol.

11. The article of claim 6, wherein the linear resin comprise at least one of the following linear materials: polyurethanes, polyureas, polyurethane ureas, polypolyesters, polycarbonate, ABS, polyolefins, acrylic and methacrylic acid ester polymers and copolymers, polyvinyl chloride polymers and copolymers, polyvinyl acetate polymers and copolymers, polyamide polymers and copolymers, fluorine containing polymers and copolymers, silicones, silicone containing copolymers, thermoplastic elastomers, and combinations thereof.

12. The article of claim 1, wherein the refractive index of the microspheres is less than 1.6.

13. The article of claim 1, wherein the plurality microspheres are transparent.

14. The article of claim 1, wherein the plurality of microspheres comprises the microspheres arranged in a pattern.

15. A thermoset article derived from claim 1.

16. The article of claim 1, wherein the microspheres have an average diameter of 20 to 200 micrometers.

* * * * *